US008994584B2

(12) United States Patent
Ranney et al.

(10) Patent No.: US 8,994,584 B2
(45) Date of Patent: Mar. 31, 2015

(54) AUTOFOCUS-BASED COMPENSATION (ABC) SYSTEM AND METHOD FOR A HOVERING GROUND MOVING TARGET INDICATION (GMTI) SENSOR

(75) Inventors: Kenneth I. Ranney, Rockville, MD (US); Geoffrey H. Goldman, Ellicot City, MD (US); Roberto Innocenti, Clarksville, MD (US); Jerry Lee Silvious, Burke, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 343 days.

(21) Appl. No.: 13/488,750

(22) Filed: Jun. 5, 2012

(65) Prior Publication Data

US 2014/0009324 A1    Jan. 9, 2014

Related U.S. Application Data

(60) Provisional application No. 61/495,783, filed on Jun. 10, 2011.

(51) Int. Cl.
| | | |
|---|---|---|
| *G01S 13/52* | (2006.01) | |
| *G01S 13/534* | (2006.01) | |
| *G01S 13/42* | (2006.01) | |
| *G01S 13/524* | (2006.01) | |
| *G01S 13/90* | (2006.01) | |
| *G01S 13/02* | (2006.01) | |

(52) U.S. Cl.
CPC .............. *G01S 13/534* (2013.01); *G01S 13/42* (2013.01); *G01S 13/5242* (2013.01); *G01S 13/5244* (2013.01); *G01S 13/5246* (2013.01); *G01S 13/9029* (2013.01); *G01S 2013/0245* (2013.01)
USPC .......................................... 342/161; 342/157

(58) Field of Classification Search
CPC .................................................... G01S 13/5242
USPC .................................................. 342/157, 161
See application file for complete search history.

(56) References Cited

U.S. PATENT DOCUMENTS

2005/0280571 A1 * 12/2005 Abatzoglou et al. ........ 342/25 B

OTHER PUBLICATIONS

Van Veen, B. D. and Buckley, K. M., "Beamforming: A Versatile Approach to Spatial Filtering," IEEE ASSP Magazine, Apr. 1988, 4-24.
Brennan, L. E.; Mallext, J. D.; and Reed, I. S.; "Adaptive arrays in airborne MTI", IEEE Trans., 1976, AP-24, (5), pp. 607-615.

(Continued)

*Primary Examiner* — Timothy A Brainard
(74) *Attorney, Agent, or Firm* — Eric B. Compton

(57) ABSTRACT

Embodiments of the present invention generally relate to motion compensation, and in particular to an autofocus-based compensation (ABC) systems and methods for a ground moving target indication platform. According to one embodiment, a method for autofocus based compensation of range data acquired from an object in motion is provided. The method may include: receiving range data; steering at least one receive beam of the range data in a desired direction; transforming the range data into the range domain; determining the width of a main clutter lobe; excluding data that is not part of the main lobe clutter response; transforming the main-lobe clutter response into the range domain; calculating a phase correction term; and applying the phase correction to the original range data.

17 Claims, 23 Drawing Sheets

(56) References Cited

OTHER PUBLICATIONS

Ward, J., 'Space-time adaptive processing for airborne radar'. Technical Report No. 1015, Lincoln Laboratory, MIT, Dec. 1994.

Wahl, D. E.; Eichel, P. H.; Ghiglia, D. C.; Jakowatz, C. V. "Phase Gradient Autofocus—A Robust Tool for High Resolution SAR Phase Correction," IEEE Transactions on Aerospace and Electronic Systems Jul. 1994, 30 (3), 827-835.

Jakowatz, C. V.; Wahl, D. E.; Eichel, P. H.; Ghiglia, D. C.; Thompson, P. A. Spotlight-Mode Synthetic Aperture Radar: A Signal Processing Approach, Kluwer Academic Publishers, Boston, 1996, pp. 251-269.

\* cited by examiner

Original

Uncompensated Linear Trajectory

Uncompensated Quadratic Trajectory

Original

With Autofocus correction

1300a

1300b

AUTOFOCUS-BASED COMPENSATION (ABC) SYSTEM AND METHOD FOR A HOVERING GROUND MOVING TARGET INDICATION (GMTI) SENSOR

CROSS-REFERENCE TO RELATED APPLICATION(S)

This application claims the benefit of U.S. Provisional Patent Application No. 61/495,783 filed on Jun. 10, 2011, herein incorporated by reference in its entirety.

GOVERNMENT INTEREST

Governmental Interest—The invention described herein may be manufactured, used and licensed by or for the U.S. Government.

BACKGROUND OF THE INVENTION i) Field of Invention

Embodiments of the present invention generally relate to motion compensation, and in particular to an autofocus-based compensation (ABC) systems and methods for a ground moving target indication (GMTI) sensor.

ii) Description of Related Art

Various military and non-military organizations use moving target indication (MTI) radar systems—both ground-based and airborne. Most of these systems process data in the frequency domain, detecting the Doppler shift induced on a transmitted waveform by the radial velocity of the moving target. Since they process target returns appearing at specific Doppler frequencies, it is important that their relative spatial location be precisely specified throughout the entire processing interval. Without accurate position information, processing algorithms cannot correct for phase errors introduced by platform motion. This is generally not an issue for stationary, ground-based systems; but it is critically important for airborne systems, including the helicopter-based multi-channel system that was considered.

In a typical hovering airborne GMTI radar system, a post-processor uses simultaneously collected platform position and orientation information to correct for motion-induced errors in the measured signal phases. This motion compensation (MOCOMP) system performs well provided that the position measurement system produces high-precision outputs. If, however, the position measurements are imprecise; then the downstream GMTI algorithm may be unable to detect specific targets of interest. This may be especially true when the target of interest has low radar cross section (RCS) and is moving at low speed. The small amount of energy available in its GMTI signature would likely smear across multiple Doppler bins, making it indistinguishable from large sidelobes of the main clutter ridge concentrated near the 0 Hz Doppler bin.

BRIEF SUMMARY OF THE INVENTION

According to one embodiment, a method for autofocus based compensation of range data acquired from an object in motion is provided. The method may include: receiving range data; steering at least one receive beam of the range data in a desired direction; transforming the range data into the range domain; determining the width of a main clutter lobe; excluding data that is not part of the main lobe clutter response; transforming the main-lobe clutter response into the range domain; calculating a phase correction term; and applying the phase correction to the original range data.

According to another embodiment, a system for autofocus based compensation for range data acquired from an object in motion is provided. The system may include: a processor configured to: receive range data; steer at least one receive beam of the range data in a desired direction; transform the range data into the range domain; determine the width of a main clutter lobe; exclude data that is not part of the main lobe clutter response; transform the main-lobe clutter response into the range domain; calculate a phase correction term; and apply the phase correction to the original range data.

According to yet another embodiment, a computer-readable storage medium having computer-readable instructions, that when executed by a processor, implement a method for autofocus based compensation of range data acquired from an object in motion is provided. The method executed by the computer-readable instructions may include: receiving range data; steering at least one receive beam of the range data in a desired direction; transforming the range data into the range domain; determining the width of a main clutter lobe; excluding data that is not part of the main lobe clutter response; transforming the main-lobe clutter response into the range domain; calculating a phase correction term; and applying the phase correction to the original range data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only a few embodiments of this invention and are therefore not to be considered limiting of its scope, for the invention may admit to other equally effective embodiments. These embodiments are intended to be included within the following description and protected by the accompanying claims.

DETAILED DESCRIPTION OF THE INVENTION

Embodiments of the present invention generally relate to motion compensation, and in particular to, an autofocus-based compensation (ABC) systems and methods for a GMTI sensor.

Figure 1:
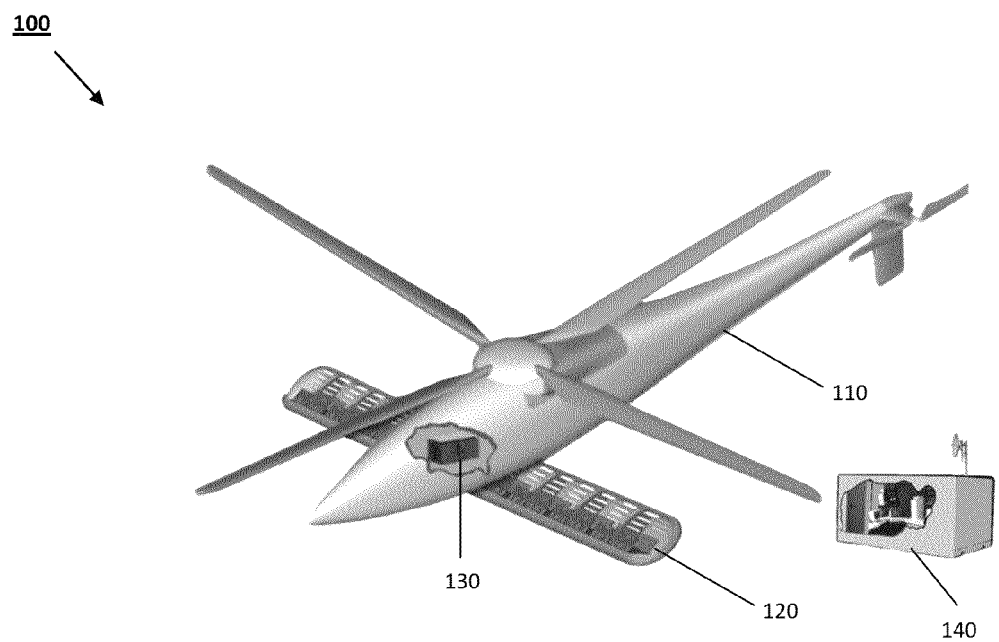
FIG. 1 illustrates a schematic of one platform system which may be used with embodiments of the present invention.

FIG. 1 illustrates a schematic of one platform system 100 which may be used with one or more embodiments of the present invention. System 100 may be implemented as part of a modified DARPA FORESTER system as shown. However, it will be appreciated that other antenna array-based systems might also be used, such as, Northrop Grumman's ARTEMIS system, in other embodiments.

The Defense Advanced Research Projects Agency (DARPA) recently developed the Foliage Penetrating, Reconnaissance, Surveillance, Tracking, and Engagement Radar (FORESTER) system. The foliage penetration (FOPEN) requirement dictates that the system's operational frequencies are low, which results in small Doppler frequency shifts. In addition, the system must detect partially concealed dismounts with small radar cross section (RCS) moving at relatively slow speeds. The FORESTER system includes a suite of sensors for measuring the platform's position, velocity, yaw, pitch, and roll, enabling it to realize a long coherent processing interval (CPI) and produce high-resolution Doppler measurements.

Ideally, the FORESTER system would hover motionlessly during a CPI, but this may be an unrealistic expectation for such a (relatively) long interval. Inevitably, a certain amount of platform drift introduces phase distortions into the received signal resulting in blurred range-Doppler imagery. Typically, a post-processor uses simultaneously collected platform position and orientation information to correct for these motion-induced errors in the measured signal phases. If the platform position measurement system fails to correct for all the errors, then alternative motion compensation (MOCOMP) solution to obtain high-quality MTI data may be required.

As shown in FIG. 1, a platform 110 may be a rotary positioner craft, such as an A160 Hummingbird helicopter unmanned aerial vehicle (UAV). When deployed, this platform 110 may hover and track ground moving objects and targets.

An antenna array 120 is mounted, and/or otherwise designed, to be carried underneath or by the platform 110. For instance, it may be housed in large "pod" transversely mounted on the platform 110 in some embodiments. The antenna array 120 can be positioned to provide desired surveillance of a certain sector or area, and then electronically scanned across that sector. FORESTER, for example, is a multi-channel system which includes an array of 16 active elements. In some embodiments, the antenna array 120 may be maintained at a predetermined azimuth using a drive controller.

An onboard electronics system 130 may be provided within the platform 110, which include that includes the radar transmitter, receiver, and signal processor. For instance, it may be housed within the fuselage of the platform 110. Doppler range data may be collected by the antenna array 120 and processed by the electronics system 130. The collected Doppler data may be communicated remotely, via radio frequency (RF) communications, to a control station 140, such as a fixed command station, a mobile vehicle-platform and/or to other platforms including ground-, aerial-, satellite-, or sea-based platforms. Accordingly, the system 100 provides target tracking, data display, and operator control capability.

In other embodiments, the platform 110 might be an aerial moving vehicle, such as an airplane, helicopter, UAV, dirigible, balloon, blimp, or other aircraft. Or the platform could be a marine vehicle such as a submarine, ship, boat, hovercraft, etc, or a space-based platform such as a satellite or spacecraft. Radar or other electromagnetic ranging may be used in some instances. In the case of an underwater vehicle, sonar (an acronym for SOund Navigation And Ranging) may be used, which employs sound waves rather than electromagnetic (EM) radiation.

Figure 2:
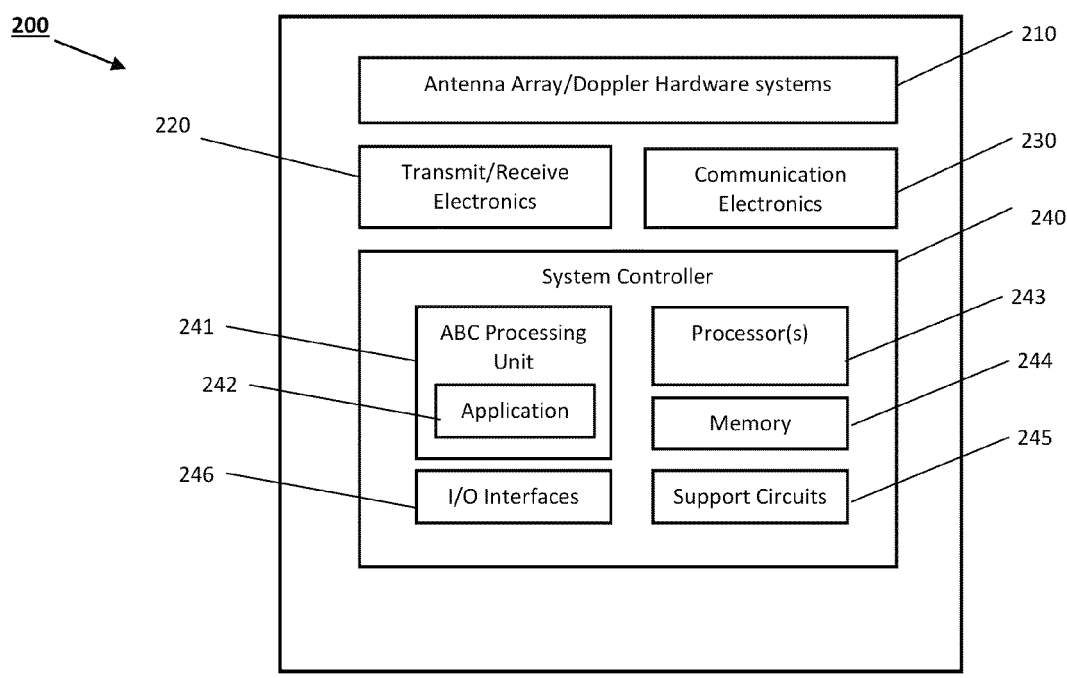
FIG. 2 illustrate a functional block diagram of an autofocus-based compensation (ABC) system according to an embodiment of the present invention.

FIG. 2 illustrate a functional block diagram of an autofocus-based compensation (ABC) system 200 according to an embodiment of the invention.

The system 200 generally includes antenna array/Doppler hardware systems 210, transmit/receive electronics 220, communication electronics 230, and system controller 240.

The antenna array/Doppler hardware systems 210 may include an array of antenna elements. As noted above, FORESTER, for example, is a multi-channel system which includes an array of 16 active elements. It uses 1024 samples collected during a relatively long CPI, and this relatively high Doppler resolution enables it to detect and track slowly moving dismounts. Each of the 16 channels collects 1024 samples at each range gate, yielding a data cube of size 1024 (number of CPI pulses)×16 (number of array elements)×nRange (number of range gates=2048 for this data set). All of the channels also collect coherent data simultaneously permitting various, beamforming strategies. Other Doppler hardware systems may be conventional.

The transmit/receive (T/R) electronics 220 include electronic systems needed to transmit and receive radar information to and from the antenna array. For instance, the T/R electronics 220 include various modulators, phase shifter, power amplifiers and harmonic filters for generating and transmitting signals for 16 channels (corresponding to 16 antennas of the antenna array 220). Similarly the T/R electronics 220 may include limiters, pre-selectors, low noise amplifiers (LNA), down-convertors and analog/digital (A/D) convertors for receiving and pre-processing signals received from the antenna array. Such electronics are generally known and will not be discussed further herein.

The communication electronics 230 include uplink and/or downlink communication systems for wireless communications between the platform and the control station. Various known RF communication frequency bands and protocols may be used. System control data, flight data, Doppler range data, Inertial Navigation System (INS)/Global Position System (GPS) data are some types of data which may be transmitted and received via the communications electronics 230.

The system controller 240 includes electronics for controlling the flight of the platform and providing range tracking. In this embodiment, range tracking uses Doppler radar. But, it should be appreciate that radar, sonar, or other EM ranging techniques could also be used. As shown, the system controller 240 includes an ABC processing unit 241 which include an ABC application 242, processor(s) 243, memory 244, support circuits 245, and input/output (I/O) interfaces 246. Status and control information may be exchanged between the various elements.

The ABC processing unit 241 is coupled to the processor(s) 243 for executing the ABC application 242 that is configured to process Doppler range data and to provide correction of errors in the Doppler range data that are induced by platform movement. The ABC application 242 may be software (firmware) created using any number of programming languages. Application 242 may include one or more modules having processor-executable instructions. Of course, it will be appreciated that any number of hardware implementations, programming languages, and operating platforms may be used. As such, the description or recitation of any specific hardware implementations, programming language, and operating platforms herein is exemplary only and should not be viewed as limiting.

Alternatively or additionally, the application 242 may be a stand-alone application running on a computer which interfaces with the platform control systems, for example, though a remote network connection, or via a computer readable storage media (i.e., flash memory, DVD/CD-ROM, floppy disk, removable or permanent hard drive, etc.). In some implementations, the application may be a "plug-in" application that is incorporated into a third-party software application. Other configurations may also be implemented.

Methodology and algorithms for performing ABC processing in the absence of precise vehicle position measurements is disclosed herein. As a starting point the inventors evaluated a synthetic aperture radar (SAR) autofocus technique, and further extended this techniques to the problem of a moving platform.

The nature of the moving target indication (MTI) signature distortion due to different types of platform motion is further discussed below. The ABC processing was developed by the inventors based on their research on SAR autofocus considerations which may be performed, at least in part, by the ABC processing unit 241.

The processor(s) 243 may include one or more microprocessors as known in the art. In some implementations, software code (instructions) may be stored on a computer or machine-readable storage media having computer or machine-executable instructions executable by processor(s) 243. In some implementations, the processor(s) 243 may be a programmable processor, such as, for example, a field-programmable gate array (FGPA) or an application-specific integrated circuit (ASIC) processor.

The memory 244 may include one or more of the following: random access memory, read only memory, magneto-resistive read/write memory, optical read/write memory, cache memory, magnetic read/write memory, and the like, as well as signal-bearing media, excluding non-transitory signals such as carrier waves and the like.

The support circuits 245 may include conventional cache, power supplies, clock circuits, data registers, I/O devices, and the like. An input/output (I/O) interface 246 may be directly coupled to the memory 244 or coupled through the supporting circuits 245. The I/O interface 246 may also be configured for communication with input devices and/or output devices, such as, network devices, various storage devices, mouse, keyboard, display, and the like.

The ABC processing was applied and tested in order to document its effectiveness using moving target simulators (MTSs) in measured FORESTER data. Various appropriately defined metrics and measured responses from canonical targets were determined to quantify observations. Results demonstrate that the ABC processing does not distort canonical target responses sharpened by the measurement-based motion compensation algorithm.

The range data may be electronic data which includes distance or range values (i.e., "Range gate") at a particular frequency bands (i.e., "bins"). In some embodiments, the data may be stored and/or output as a matrix, multi-dimensional (e.g., 2-D or 3-D) array or other dataset. While certain embodiments disclosed herein are described with respect to Doppler range data, it should be appreciated that in other embodiments, sonar or radar data could be similar used similar to Doppler range data.

Experiments were performed by the inventors to determine the impact of imprecisely measured platform position on the frequency domain signatures required for MTI. Without precise platform position information, the phase relationships measured by the radar during a CPI was shown to be distorted, and the resulting target signatures were displaced and/or smeared in the range-Doppler plane. This typically led to missed or inaccurately located detections.

In particular, the experiments focused on MTSs at bearing angles of nearly 0° (relative to a line perpendicular to the array axis) using a non-adaptive beam-steering algorithm. The data from all 16 channels was coherently added together. This approach narrowed the effective beamwidth of the antenna to approximately 7°, enabling reasonable autofocus-based MOCOMP corrections to be implemented without adversely impacting downstream processing steps (such as those based on space-time adaptive processing concepts). During the experiments, the initial beamforming step proved important as preliminary attempts to formulate a MOCOMP solution for each individual channel failed due to the wide range of measured mainlobe Doppler frequencies in each channel. The narrower effective beamwidth output by the beamformer reduced the range of bearing angles included for mainlobe clutter determination, thereby reducing the undesirably large spread of mainlobe Doppler frequencies. This played an important role in estimating MOCOMP correction parameters via analysis of Fast Fourier transforms (FFT) calculated across the 1024 time-domain samples. It was the frequency-domain representation—provided by the FFT—that suitably concentrated the energy of moving targets, enabling determination of suitable MOCOMP corrections.

Figure 3A:
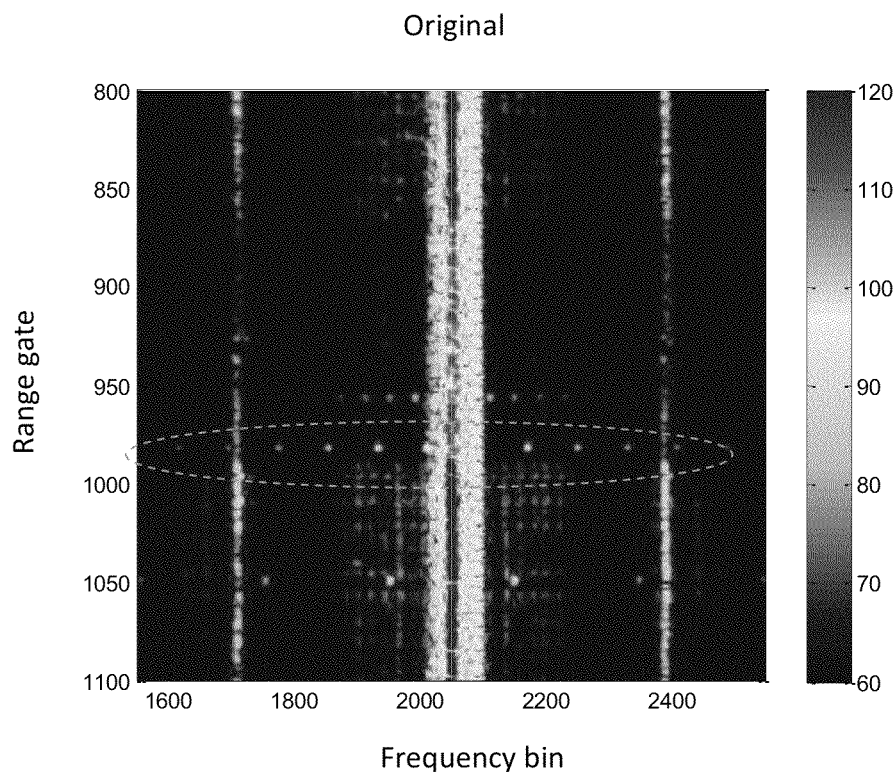
FIG. 3 illustrates emulation outputs showing the effect of uncompensated, constant-velocity aircraft motion on Doppler frequency estimation
Figure 3B:
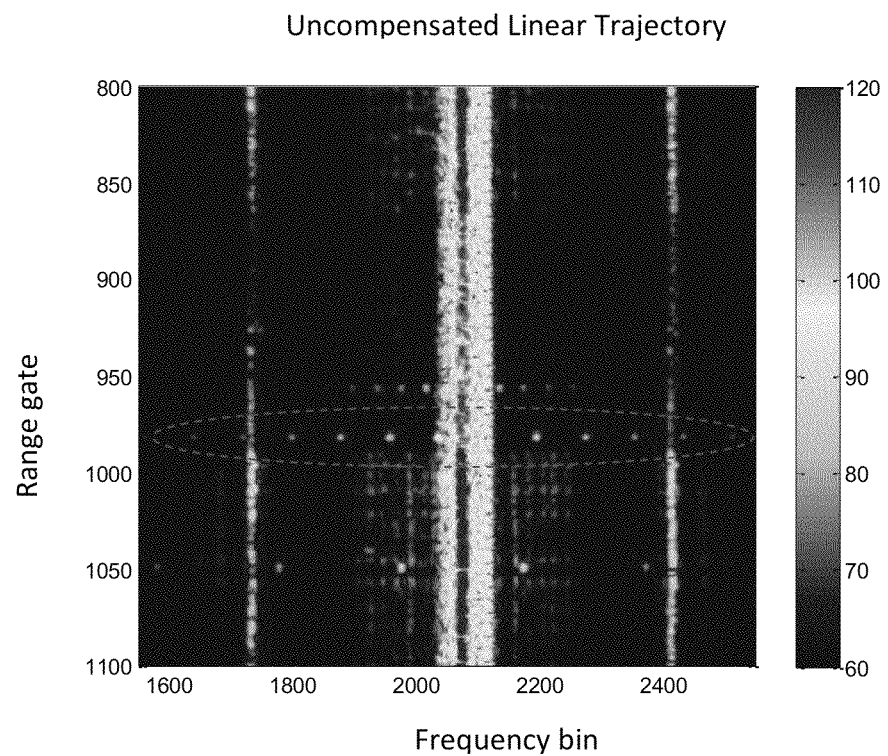
Figure 3C:
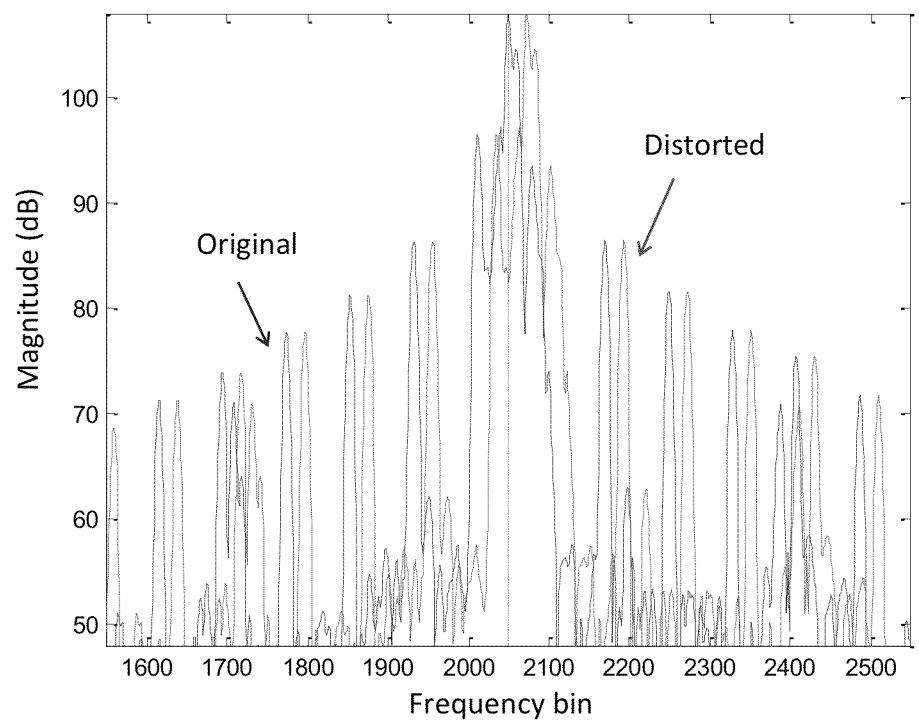
Figure 3:
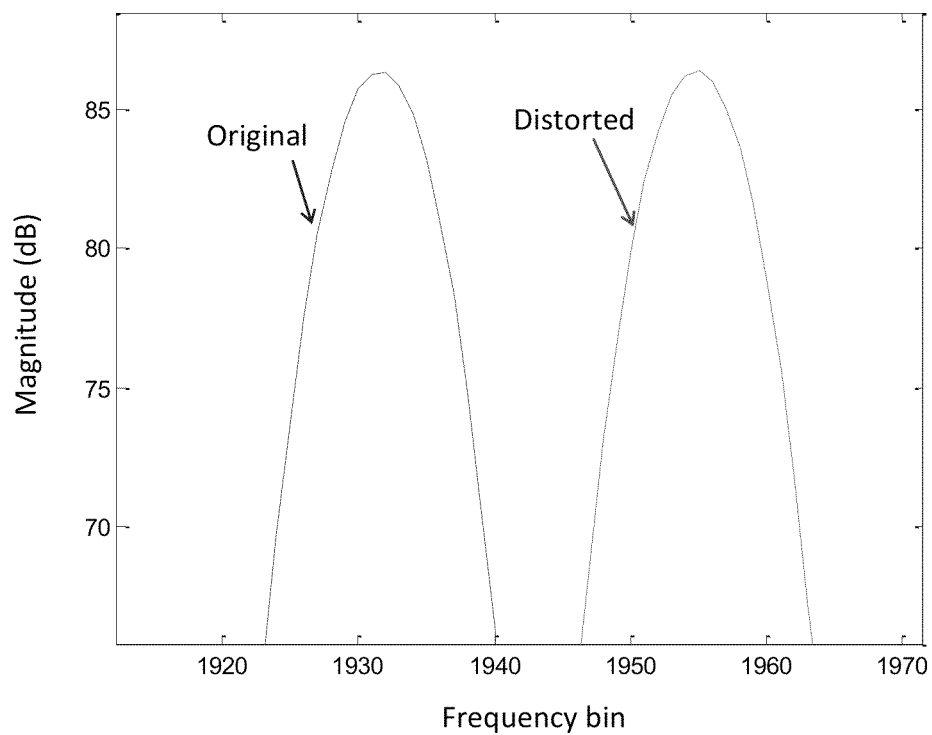

FIG. 3 illustrates emulation outputs showing the effect of uncompensated, constant-velocity aircraft motion on Doppler frequency estimation. For example, FIG. 3(*a*) shows original FORESTER data. FIG. 3(*b*) show a distorted images in which a Doppler shift is introduced by the uncompensated, constant-velocity aircraft motion in the data of FIG. 3(*a*). In these images, the MTS response should appear as point targets in the range-Doppler plane. The imagery in FIG. 3(*a*) was generated by first steering the beam to 0° (as measured perpendicular to the antenna array axis) and then performing an approximate MOCOMP.

FIG. 3(*c*) shows the frequency domain shift introduced by hypothesized, unmeasured aircraft positions. Here, the MTS Doppler signatures extracted from the range gate are indicated by the dashed ellipses. FIG. 3(*d*) is an expanded (zoomed in) view of a portion of the plot in FIG. 3(*c*). The vertical, dashed line (in both the imagery and the plots) indicates the frequency bin corresponding to zero Doppler; the final plot shows a zoom of the plot to the left. Based on the available Doppler resolution, the inventors expect an offset of slightly more than 20 frequency bins.

Figure 3E:
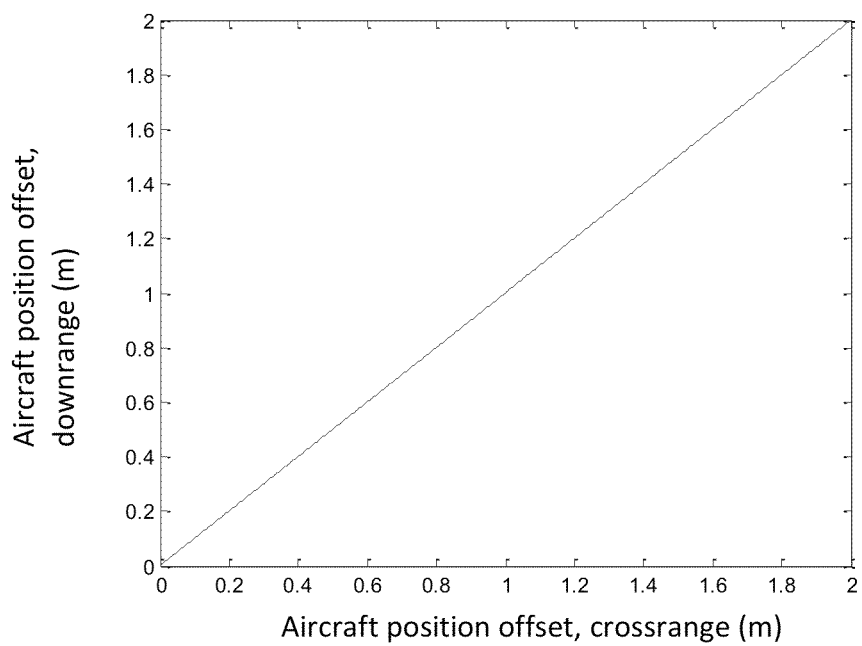

Following motion compensation, a new phase shift was introduced—at each CPI pulse—due to the undetected aircraft motion within the data collection plane (i.e., slant-range vs. cross-range) illustrated in FIG. 3(e). This new, corrupted range-Doppler image and the original uncorrupted image constitute the graphics in FIGS. 3(a) and 3(b). In these images, the MTS responses should appear as point targets in the range-Doppler plane. The linearity of the unmeasured trajectory shown in FIG. 3(e) implied that the undetected velocity was constant across the entire CPI, and the constant velocity produced the frequency domain shift evident in the aforementioned figures. Here, undetected aircraft position offsets as a function of CPI pulse number.

FIG. 4 illustrates the effects of imposing an undetected, non-linear position error onto the uncorrupted or uncompensated data of FIG. 3. FIG. 4(a) shows original Doppler range data. FIG. 4(b) shows the distortion produced in the range-Doppler imagery by this undetected, non-constant velocity, and differences between this imagery and that of FIG. 3(a) are immediately apparent. So-called "smearing" of the point-like MTS responses was noticed as being introduced by the uncompensated, non-linear aircraft trajectory. The increase in the width of the clutter mainlobe was noticed, particularly in samples greater than 100 dB.

Figure 4A:
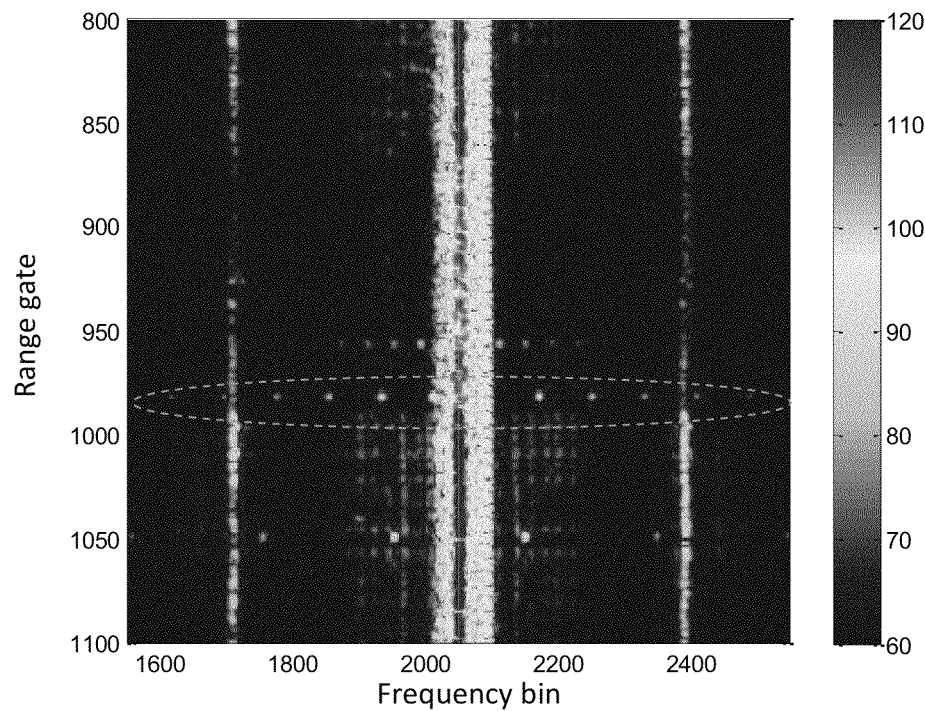
FIG. 4 illustrates effects of imposing an undetected, non-linear position error onto the uncorrupted or uncompensated data.
Figure 4B:
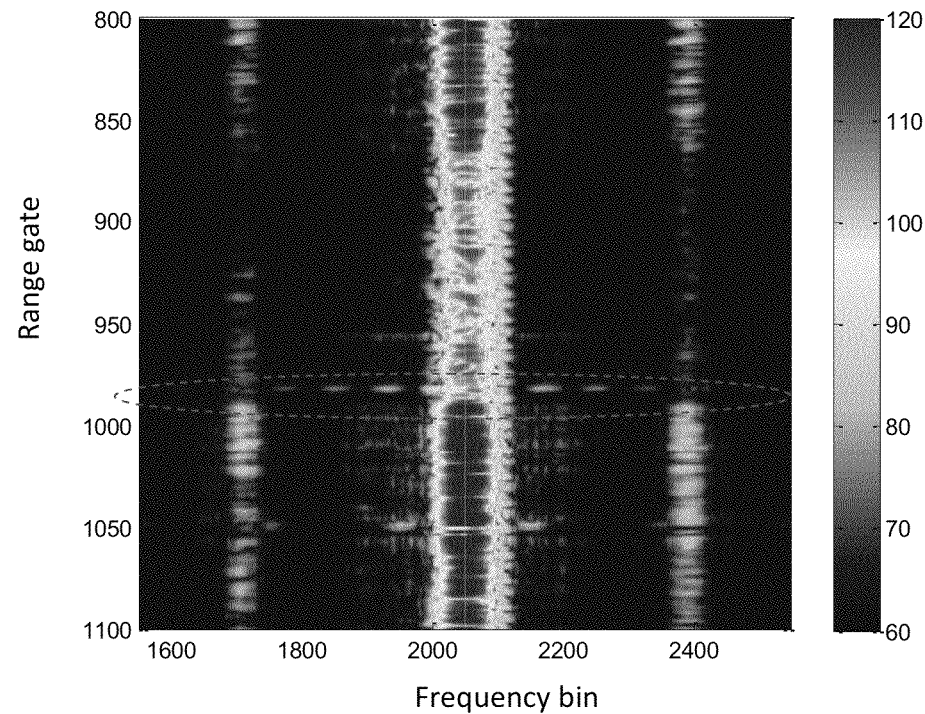
Figure 4C:
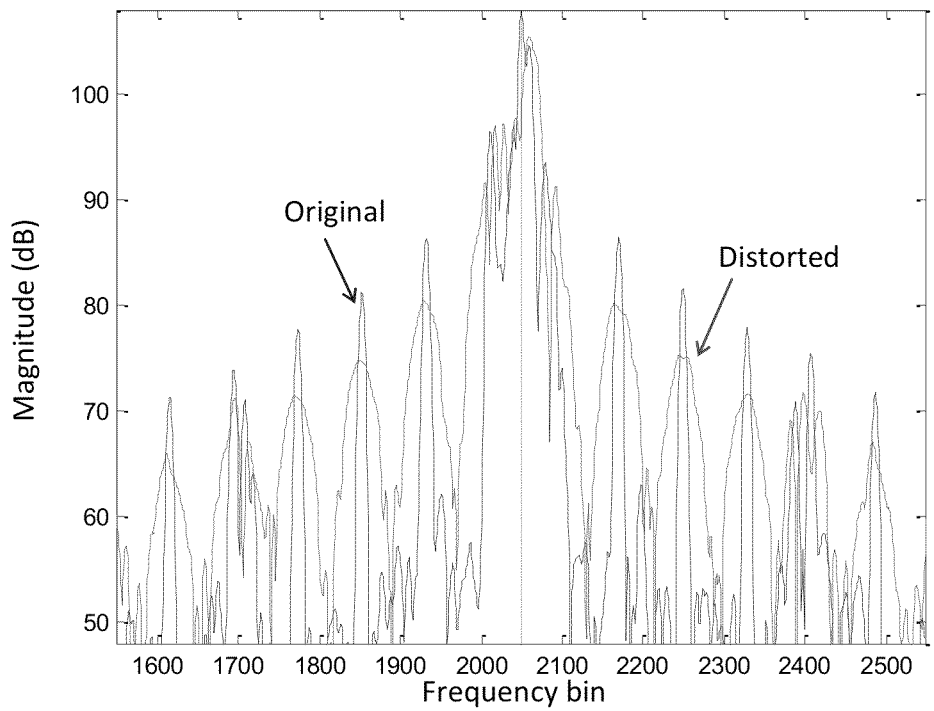
Figure 4D:
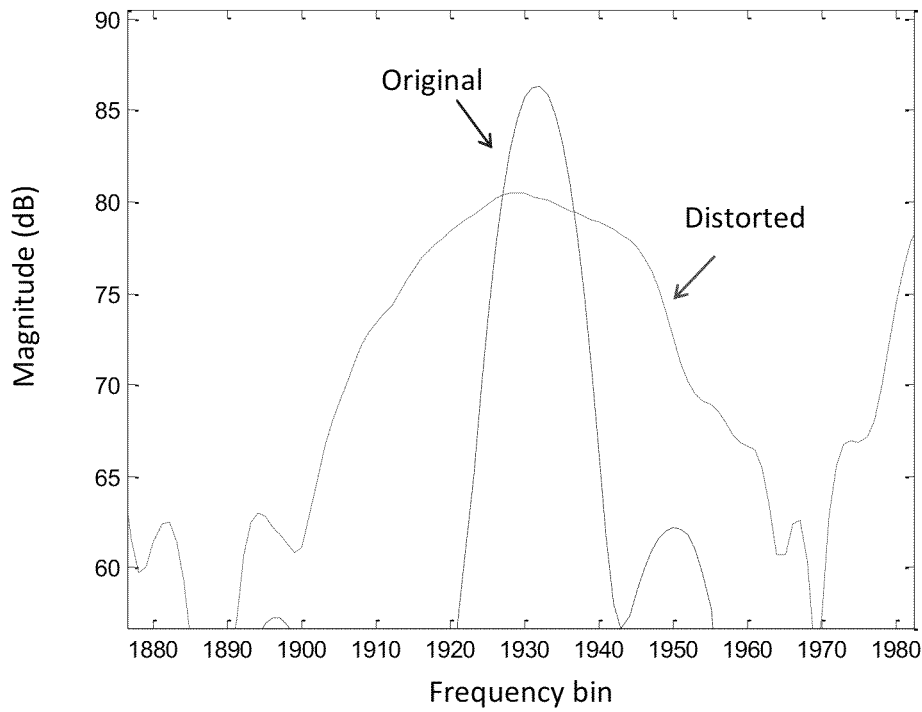
Figure 4E:
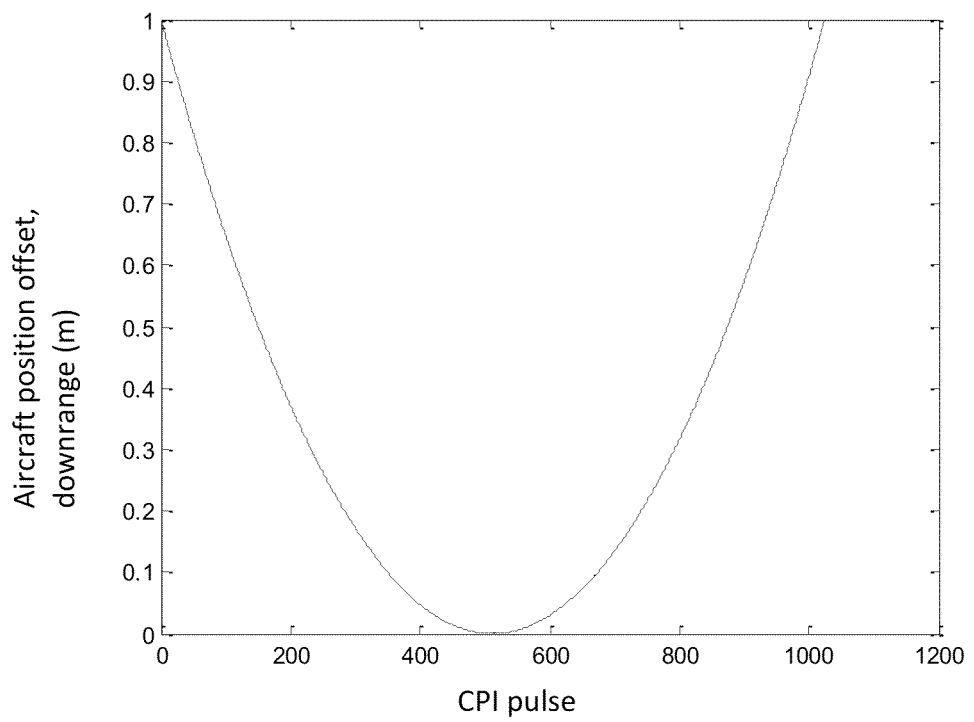
Figure 5:
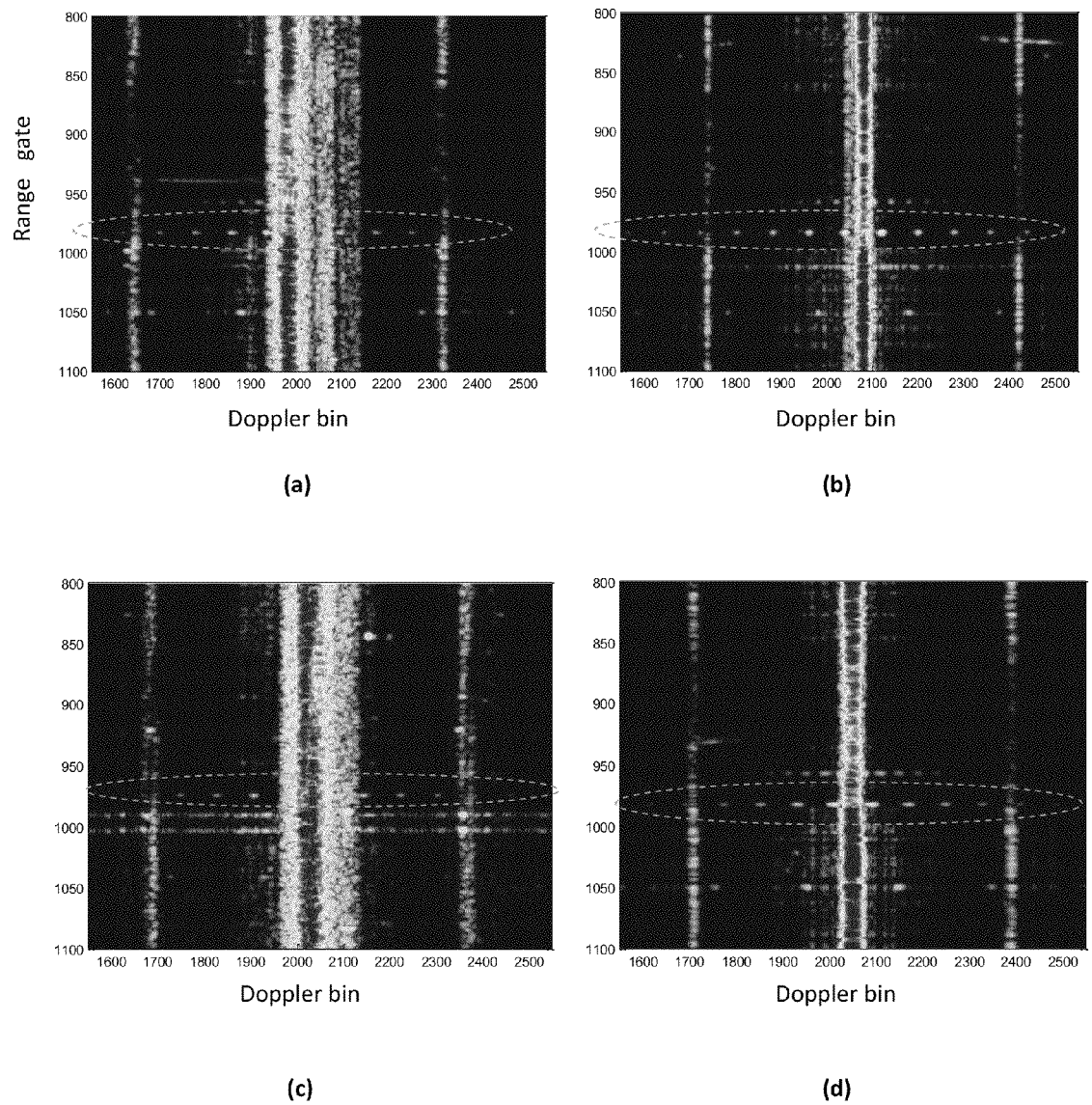
FIG. 5 illustrates various examples of uncorrected range-Doppler imagery.

In FIG. 4(c), the frequency-domain plots are again extracted from the range gate containing MTS responses—as indicated by the dashed ellipses. FIG. 4(d) is an expanded (zoomed in) view of a portion of the plot in FIG. 4(c). The vertical, dashed line (in both the imagery and the plots) indicates the frequency bin corresponding to zero Doppler; the final plot shows a zoom of the plot to the left, emphasizing the smearing introduced by the uncompensated down-range acceleration. In FIG. 4(e), the uncompensated aircraft trajectory is now non-linear, indicating the presence of an undetected acceleration in the down-range direction. Undetected aircraft position offsets as a function of CPI pulse number. The extent of the range offset ensures that the MTS never moves out of a single range gate (e.g., less than 3.75 m). The acceleration component of FIG. 4 has resulted in Doppler-domain "smearing" of the MTS point-like target responses.

Doppler-domain distortions arising from non-linear motion can have serious repercussions, as evidenced by the plots in FIG. 4(c) sand 4(d). The peak MTS signal levels realized in this instance fall approximately 6 dB below those realized prior to distortion, and this represents a significant reduction in target-to-clutter ratio—especially in view of the fact that low-RCS dismount targets are of interest. In addition, large signal levels within the clutter mainlobe clearly spread away from the zero-Doppler bin, potentially obscuring low-velocity targets.

FIGS. 5(a)-5(d) illustrate various examples of uncorrected range-Doppler imagery in FORESTER data for data cubes 10, 16, 64, and 52, respectively. Qualitative comparison with FIG. 3(a), for example, reveals the differences due to uncompensated motion. It is apparent that there are artifacts due to both smearing and frequency shifting. In FIG. 5, the Doppler bins have been interpolated by a factor of 4.

For instance, the inventors believed that the SAR imaging community has also recognized certain problems associated with uncompensated platform motion. One MOCOMP algorithm considered by the inventors, i.e., the phase gradient autofocus (PGA) algorithm, appeared in the late 1980s and has been successfully applied to a wide variety of SAR imagery. After careful consideration of current MTI problems, the inventors recognized that the fundamental MOCOMP problem is similar to that of the SAR community in some regards. A goal is to reduce or eliminate phase errors due to unmeasured aircraft motion. Thus, the inventors considered the effects of uncompensated aircraft motion on SAR image processing and the incorporation of autofocus techniques to ameliorate these effects.

The spatial resolution within a SAR image depends mainly upon two factors: (i) the transmitted bandwidth for down-range (or "cross-track") resolution, and (ii) the synthetic aperture length—expressed in terms of the transmitted wavelength—for cross-range (or "along-track") resolution. As documented in earlier descriptions of the time-domain, back-projection algorithm, cross-range resolution may be obtained by coherently integrating pulses from range gates corresponding to a particular image pixel. That is, for every along-track position within a synthetic aperture, the round-trip time of flight for the radar signal from a specified radar position to a particular image coordinate is calculated. Then all of the data samples extracted at the appropriate delay for each aperture position (i.e., the sample corresponding to the round-trip time of flight) are coherently added. This process may be repeated at each pixel of the processed image to obtain the desired SAR image. Errors in the recorded aircraft position produce errors in the estimated signal time of flight, and these are the errors that SAR autofocus routines, such as phase gradient autofocus (PGA) algorithm, attempt to eliminate.

Realizing that a time delay at a specific transmitted frequency corresponds to a phase shift, the inventors recognized that unwanted deviations from the known aircraft trajectory produce phase deviations that must be detected and eliminated during image formation. The PGA accomplishes this by using large target responses within the focused SAR image to adaptively estimate the phase distortion produced by the undetected aircraft motion.

Figure 6:
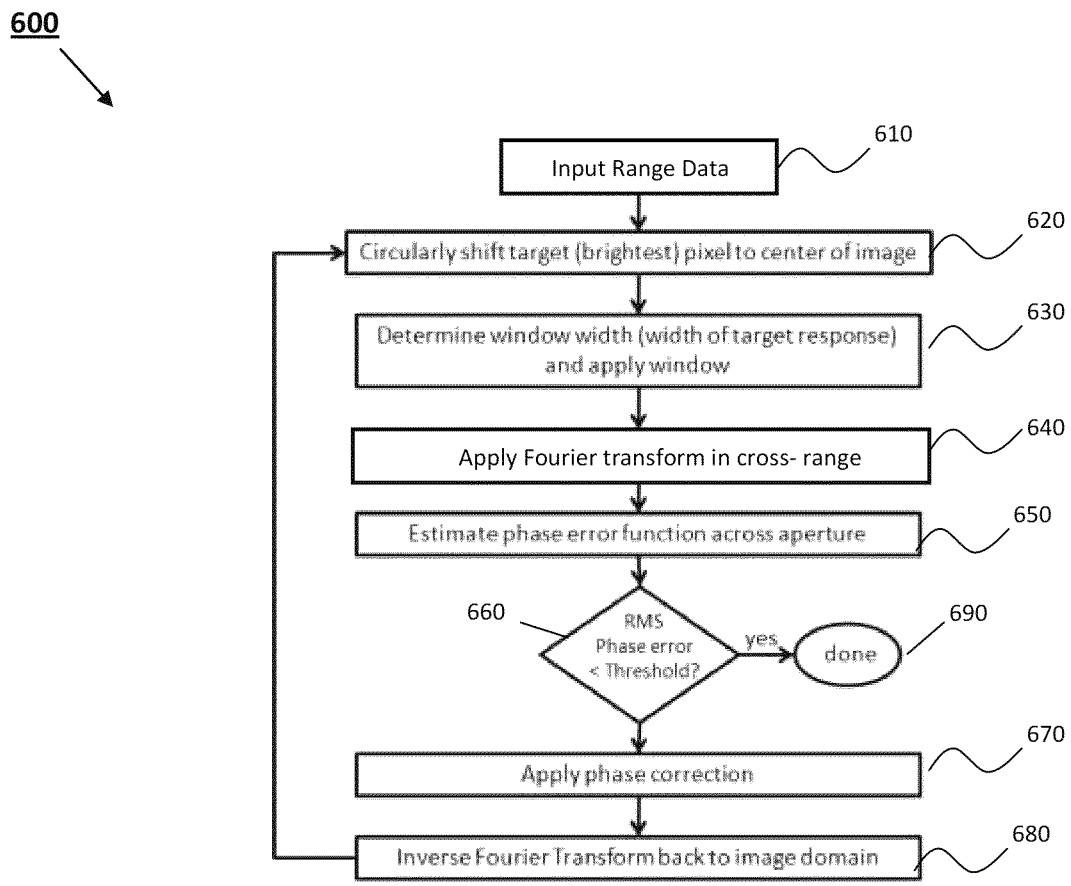
FIG. 6 shows a generally block diagram of the basic PGA algorithm.

FIG. 6 shows a generally block diagram of the basic PGA algorithm as modified by the inventors. The basic PGA algorithm is discussed by Jakowatz, C. V et al. in "Spotlight-Mode Synthetic Aperture Radar: A Signal Processing Approach," Kluwer Academic Publishers, Boston, 1996, pp. 251-269, herein incorporated by reference.

From the block diagram and the detailed discussion therein, it was realized that, following the initial circular shift and windowing, all targets should appear as nearly point-like responses. Since the target signatures also are centered, there should be no additional frequency-domain phase terms arising from time shifts. That is, following cross-range decompression (the FFT step), each target sample summed across the synthetic aperture should have the same phase, thereby producing the largest coherent sum. The PGA phase correction terms may be calculated as follows:

$$\Delta \hat{\phi}(m) = \angle \sum_{k=1}^{N} f^*(k, m-1) f(k, m) \text{ and} \quad (1)$$

$$\hat{\phi}(m) = \sum_{l=1}^{m} \Delta \hat{\phi}(l), \quad (2)$$

where $\angle(f)$ denotes "phase angle," $f(k,m)$ is the radar measurement for the $m^{th}$ pulse at the $k^{th}$ range gate (i.e., the range gate k, "decompressed"—or Fourier-transformed—in the cross-range dimension), $f^*(m)$ is the complex conjugate of $f(m)$, and N is the number of range gates used to estimate the phase correction—typically equal to the number of range gates in the image. The "corrected" measurement then becomes:

$$\tilde{F}(k,u) = \text{IFFT}_m\{f(k,m)e^{-i\hat{\phi}(m)}\}. \qquad (3)$$

From equations 1, 2, and 3, it was recognized that the phase gradient correction attempts to adjust the phase at each pulse to approximate the phase of the first pulse. This should achieve, as closely as possible, the constant phase desired prior to cross-range integration via the FFT.

An Autofocus-based Compensation (ABC) algorithm according to embodiments of the invention was derived from the PGA algorithm as applied to MTI datasets by the inventors.

For the ABC algorithm processing, the MTI image domain corresponds to the range-Doppler plane, a space versus frequency plane, as opposed to the SAR image domain, which corresponds to a purely spatial plane. As recognized by the inventors, a fundamental problem in both cases centers about the detection and elimination of phase distortions impacting the summation that determines the final image pixel value.

The methodology outlined in the block diagram of FIG. 6 was modified from a known PGA algorithm by the inventors. In particular, the SAR data of PGA algorithm was replaced with the Doppler range data, and the SAR's cross-range dimension for SAR data was replaced with the MTI's Doppler dimension. After incorporation of these modifications, the other MTI steps may proceed similarly as per the SAR PGA algorithm. Other differences may relate to the number of range gates, N, used to calculate the correction term, the number of iterations performed prior to algorithm termination, and the procedure used to implement the "circular shift." In an effort to limit the amount of computation required for MOCOMP, the number of background gates was limited. For instance, N may represent 400 background gates. This approach also has the added benefit of retaining a more localized estimate of the phase correction function. Similarly, after observing that a single iteration yields almost all of the improvement, the number of calculations required was reduced by evaluating only a single iteration of the algorithm (i.e., by calculating the phase correction function only once). Finally, since the amount of circular shift is small and consistent throughout all of the range gates (recall that the "target" in this case is the main clutter ridge at zero Doppler), it was incorporated into the overall phase correction function.

While this brief description touches upon the elements of the processing chain of FIG. 6 that were altered, it is useful to discuss in detail how the processing steps in FIG. 6 are adapted for MTI processing. Each of the steps is addressed below.

In step 610, where SAR image is ordinarily input, range data (e.g., Doppler range data) is now the input to the system. As mentioned previously, the FORESTER data cube comprises measurements from 16 channels, 1024 CPI pulses, and 2048 range gates. Thus, the 3D data cube that includes FORESTER measurements must be reduced to a 2D data cube suitable for autofocus processing. For instance, the 16 channels of data may be collapsed by coherently summing them (i.e., forming a beam at 0° relative to a line perpendicular to the antenna array) to create a 2048×1024 matrix of range and CPI values. Collapsing refers to a data dimensionality reduction process, which here is from 2048×1024×16 to 2048×1024. The collapsing process may be described as follows:

$$g(i,j) = \sum_{k=1}^{Nc} d(i,j,k), \qquad (4)$$

where d(i,j,k) denotes the original data cube, and Nc denotes the number of receive channels.

Next, an unweighted FFT is calculated across CPI pulses for each of the range gates as follows:

$$G(m,n) = K \sum_{k=0}^{Np-1} g(m,k)e^{-j2\pi kn/N}, \text{ where } K \text{ is a scale factor.} \qquad (5)$$

In the example here, there are 2048 range gates.

And, the result is circularly shifted such that the zero-Doppler bin appears in the center column as follows:

$$G_{circular\ shift}(i) = G((i+N/2) \bmod N), \text{for } i=0,1,\ 2\ldots,N-1. \qquad (6)$$

This version of the range-Doppler matrix serves as an input to the main processing loop. The relationship between the range-Doppler domain and the range-CPI domain is preserved. As a result, an inverse fast Fourier transform (IFFT) may be used instead of the FFT.

Figure 19:
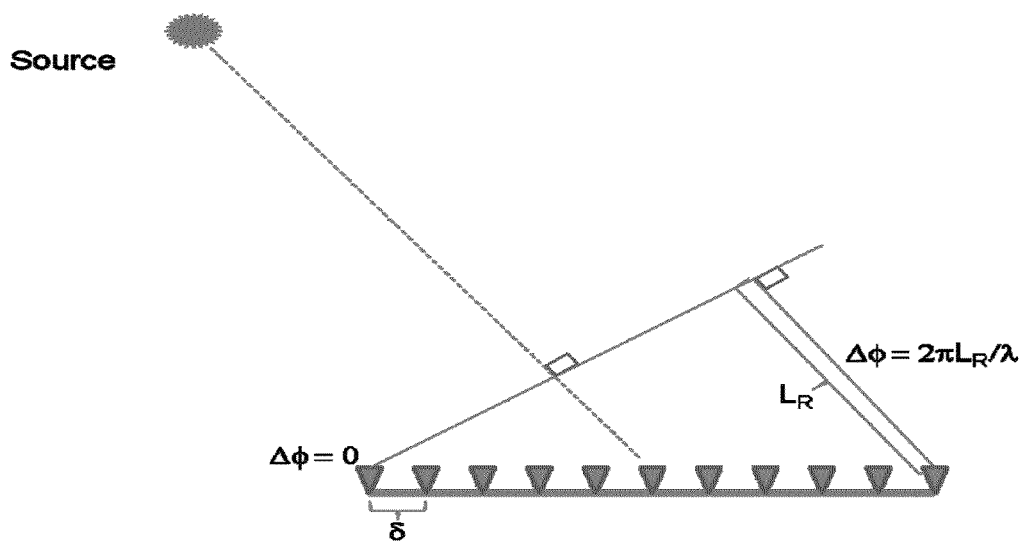
FIG. 19 illustrates applying a phase shift to input data.

To illustrate applying a shift to input data further reference is made to FIG. 19. Here, R is the range to the target area and L is the array length. Since R may be much larger than L, the phase correction calculated to the center of the array can effectively be applied to each channel. The antennas in the array are spaced apart by a distance δ. Finally, since the phase correction Δϕ is calculated for a broadside antenna beam (i.e. a beam that is directed along a ray perpendicular to the axis of the antenna array), it sharpens the response from targets located at angles near 0° relative to a line perpendicular to the array axis. To optimally process targets at other angles, the proper phase shifts Δϕ would be applied to the data in each channel to steer the beam in that direction based on the $L_R$ and the wavelength λ corresponding to the center frequency as follows:

$$\Delta\phi = 2\pi L_R/\lambda \qquad (7)$$

Referring back to FIG. 6, in step 620, the target (e.g., brightest) pixel is circularly shifted to the center of the image. In one implementation, the brightest pixel may be calculated as follows:

$$P_{max} = \max_{(i,j)\in R}(\|I(i,j)\|), \text{ where } R \text{ is a region of interest.} \qquad (8)$$

Following the FFT, the complex magnitude is calculated for each Doppler signature, by applying a moving average filter to the magnitude of each signature, and then locating the brightest pixel and verifying that this pixel is located near the center of the signature. That is, the main clutter ridge produces the maximum pixel value. No additional modifications may be further required since a correction for the Doppler offset can be incorporated into the final phase correction function.

In step 630, an appropriate window width (i.e., width of the target response) is determined and applied. Typically, this width represents the distance between the first pixels more than M dB below the peak, where M is a number such as 10, for instance. After determining the location of the main clutter lobe, its width may be estimated by finding the two Doppler bins, e.g., in the filtered "magnitude" signature—one on either side of the peak, that are closest to being a predetermined threshold below the maximum pixel. The main clutter lobe is the set of pixels within a given range gate with values that are less than M dB below the peak. The main clutter ridge denotes the surface created by the main clutter lobes from multiple, contiguous range gates. For example, the predetermined threshold may be 10 dB in some instances. Since these two bins lie on either side of the peak, the separation between them becomes the estimate of the width. This process may be repeated for each range gate; thus, obtaining 2048 estimates of the mainlobe width, for instance. Only a smaller, more suitable subset of the complete collection to estimate the phase correction may be employed in some instances. The rectangular window may be applied corresponding to the estimated width to the Doppler signatures in each range gate.

In step 640, a Fourier Transform is applied in the range dimension. As noted earlier, the cross-range dimension for SAR image in the conventional PGA algorithm has been replaced by the range dimension, which here is the Doppler dimension. Hence, the IFFT of the complex Doppler signature is calculated.

In step 650, a phase error function is estimated. In one embodiment, a value of N=400 in (1) may be selected in order to allow the estimator to be somewhat localized in range while still obtaining good integration gain. The samples used by the estimator may include, for example, N/2 contiguous samples abutting either side of the range cell under consideration. For the nearest and farthest range gates (i.e., those less than N/2 from the edges), it may use either the initial N samples or the final N samples.

In step 660, a determination is made whether the phase error is less than a predetermined threshold. If the root-mean-square (RMS) of the phase error is less than the threshold, the method proceeds to step 670 or otherwise commences in step 690.

Once the phase correction function for each range gate is determined, it may be applied in step 670, producing the compensated range-Doppler image given as follows:

$$\tilde{G}(k,u) = \text{FFT}_m\{g(k,m)e^{i\hat{\phi}(m)}\}, \quad (9)$$

where g(k,m) denotes the raw data samples collected at range gate k and CPI pulse m, $\text{FFT}_m$ denotes the FFT taken with respect to the variable m, and $\tilde{G}(k,u)$ denotes the motion-compensated range-Doppler image.

The final phase correction function, $\hat{\phi}(m)$, in equation 9 may be used to correct both for clutter mainlobe shifts and smearing due to non-linear components of the platform's trajectory. It requires no detailed information about the aircraft's position, hence it could function as either a replacement for faulty INS/GPS measurements or an enhancement to INS/GPS motion compensated range-Doppler imagery. While the above methodology assumed targets at a bearing angle of nearly 0° (relative to a line of sight perpendicular to the antenna array axis), there is nothing to prohibit the beamformer from steering to any arbitrary bearing angle. Such a step should occur naturally as part of the scanning operation of the FORESTER system.

In step 680, an inverse Fourier Transform is applied to transform the image data back to image domain. For instance, one representative inverse Fourier Transform equation which may be used is as follows:

$$g(m,n) = K' \sum_{k=0}^{Np-1} G(m,k)e^{j2\pi kn/N} \quad (10)$$

In order to quantify the ABC algorithm's effectiveness, several metrics which typically are associated with SAR data processing were evaluated by the inventors for the ABC algorithm.

The first metric considered was the average distance between points that are 6.5 dB down on either side of a MTS peak location. This quantity provided an indication of the mainlobe width of a point target, and it illustrated how effectively the algorithm eliminated "smear" in the imagery due to nonlinear aircraft motion. A comparison of the MTS mainlobe widths before and after ABC processing also indicated the degree to which the original range-Doppler image had been corrupted.

Figure 7:
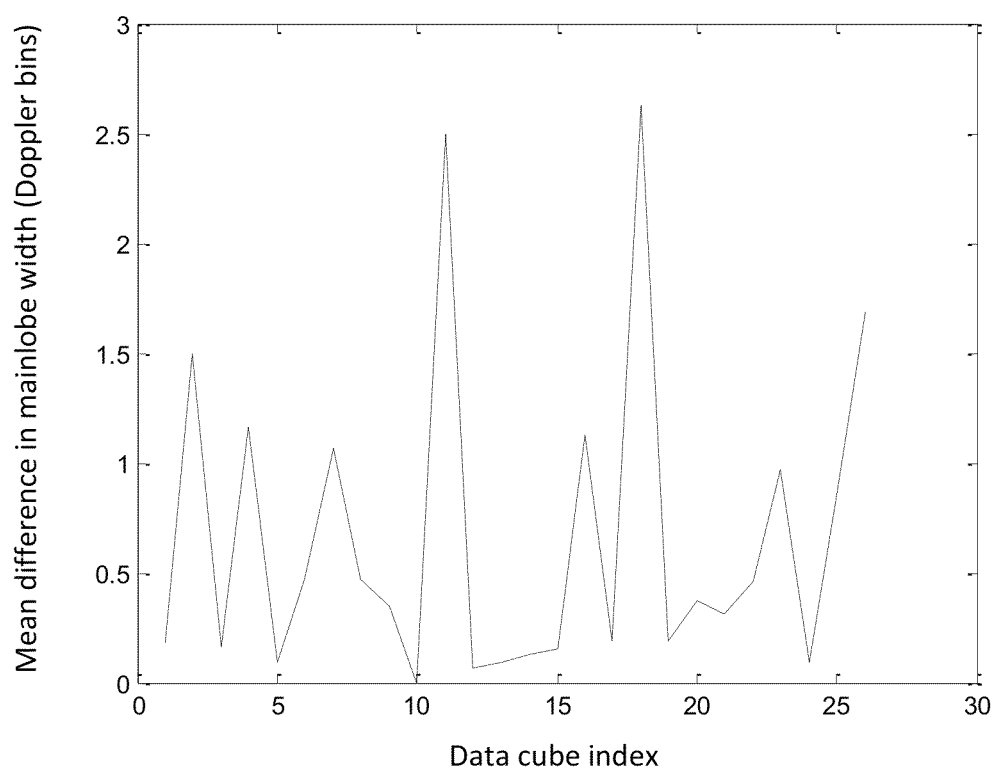
FIG. 7 shows a plot of the mean difference between compensated and uncompensated MTS mainlobe widths for each of the data cubes.

FIG. 7 shows a plot of the mean difference between compensated and uncompensated MTS mainlobe widths for each of the data cubes. Here, mainlobe width is defined by the 6.5 dB points. The difference is expressed in terms of Doppler bins. These plots show that certain cubes experienced a great deal of "smearing" (e.g., cube 11), while others did not (e.g., cube 10).

Figure 8A:
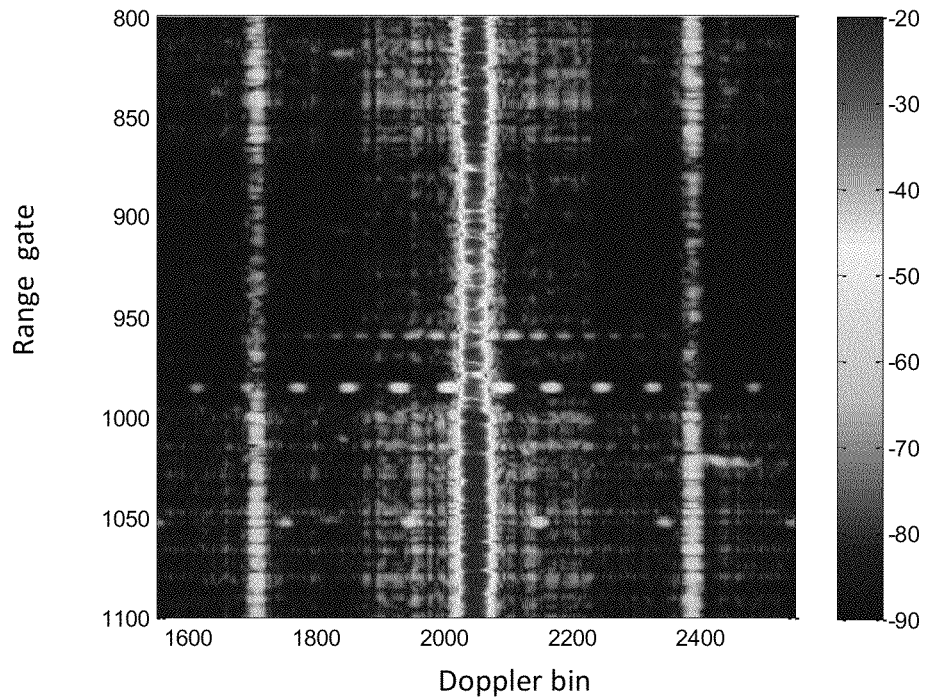
FIG. 8 illustrates plots showing distorted and corrected responses from MTSs.
Figure 8B:
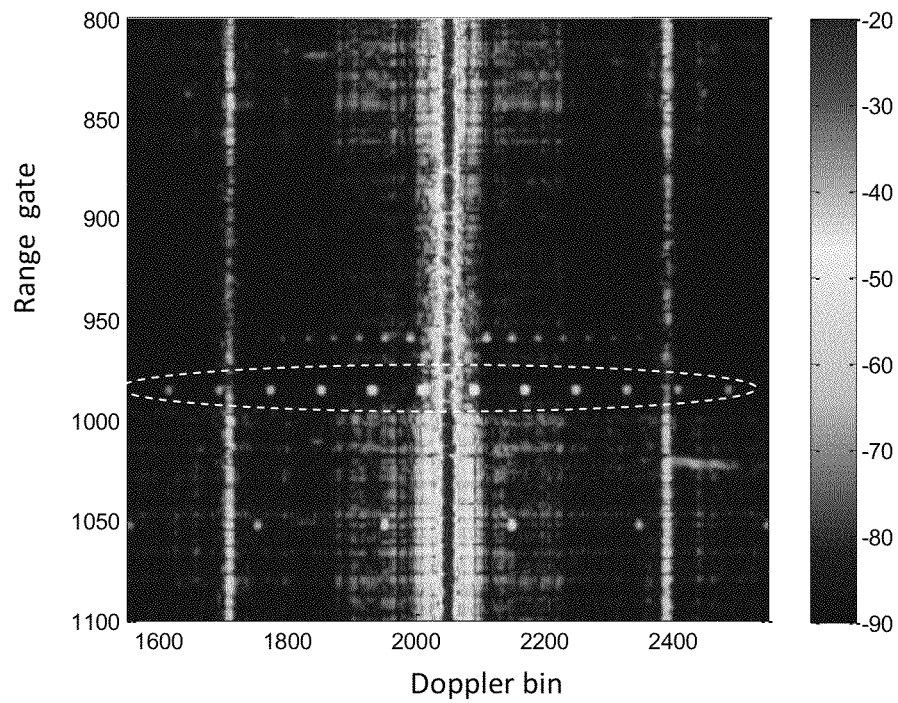

FIG. 8 illustrates plots showing distorted and corrected responses from MTSs. In particular, FIGS. 8(a) and (b) illustrate the effectiveness of applying the ABC algorithm to data cube 11. Here, data is interpolated in the Doppler dimension, producing an image that contains four times as many Doppler samples as the original image. This provides a degree of "smoothing" and made the effects of uncompensated motion more apparent in both the imagery and the plots. The "smearing," clearly evident in the MTS images of FIG. 8(a), was eliminated by ABC as evident in FIG. 8(b). In FIGS. 8(a) and 8(b), the Doppler bins have been interpolated by a factor of 4.

Figure 8C:
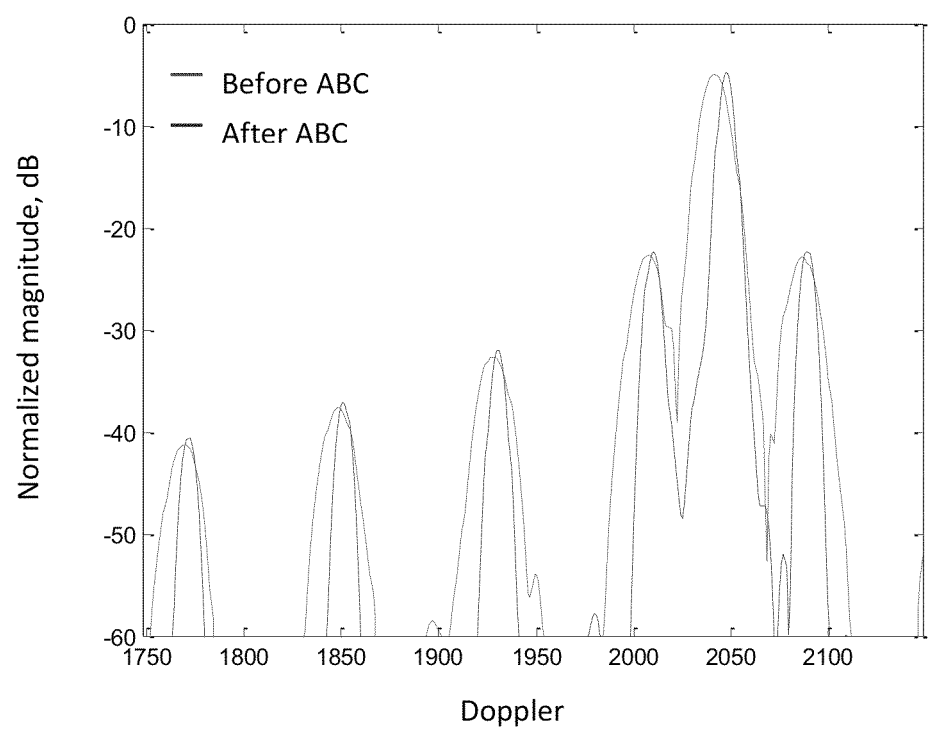

FIG. 8(c) shows a log plot of the main clutter lobe and several MTS signatures as a function of Doppler frequency bin. Here, the smooth (outer) line represents the original, uncompensated Doppler profile, while the dotted (inside) line represents the ABC-processed Doppler profile. The amount of MTS smearing is clearly evident in the plot of FIG. 8(c), as is the improvement realized via the ABC algorithm processing.

The next metric considered was target location accuracy. This metric quantifies the accuracy of the MTS Doppler location estimates by: (1) calculating the variance between target location estimates from different data cubes, and (2) determining the offset between MTS responses that were symmetric relative to zero Doppler. The inventors believed that these were important considerations, since the adaptive procedure also calculated a Doppler shift as part of the overall phase correction function. Hence, symmetric positive- and negative-MTS response locations, together with a low variance in the final MTS position estimates, combined to indicate that the procedure successfully incorporated this portion of the compensation.

Figure 9:
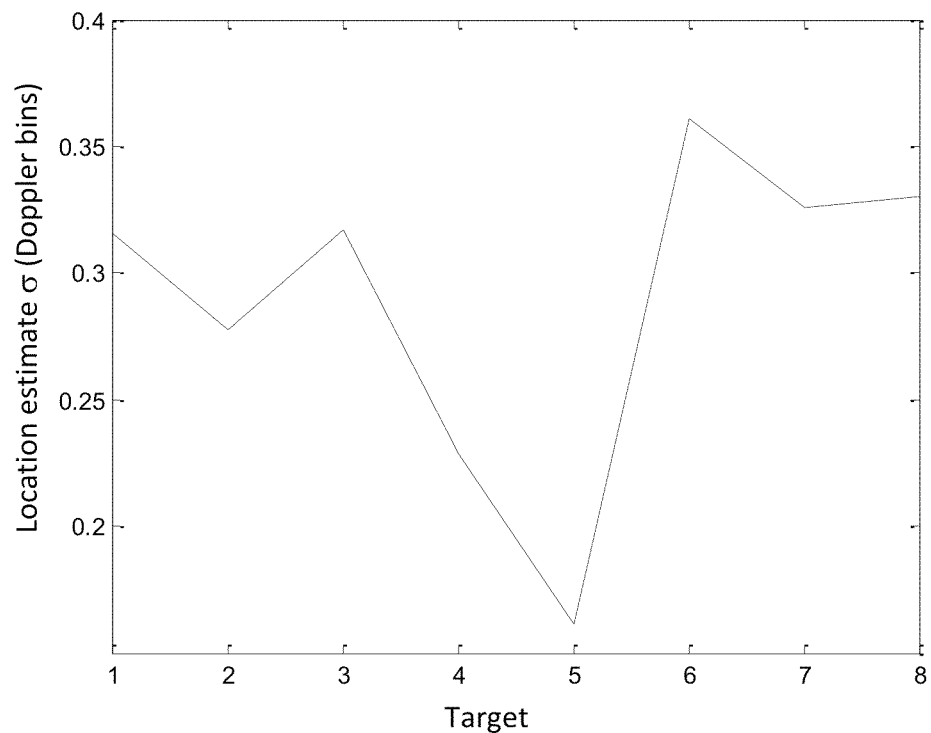
FIG. 9 is a plot showing the standard deviation calculated for each of the several MTS responses in the scene.

FIG. 9 is a plot showing the standard deviation ($\sigma = \sqrt{\text{variance}}$) calculated for each of the several MTS responses in the scene. These plots demonstrate that the 2-sigma point of the deviations from estimated MTS response locations is still less than one Doppler bin.

Figure 10:
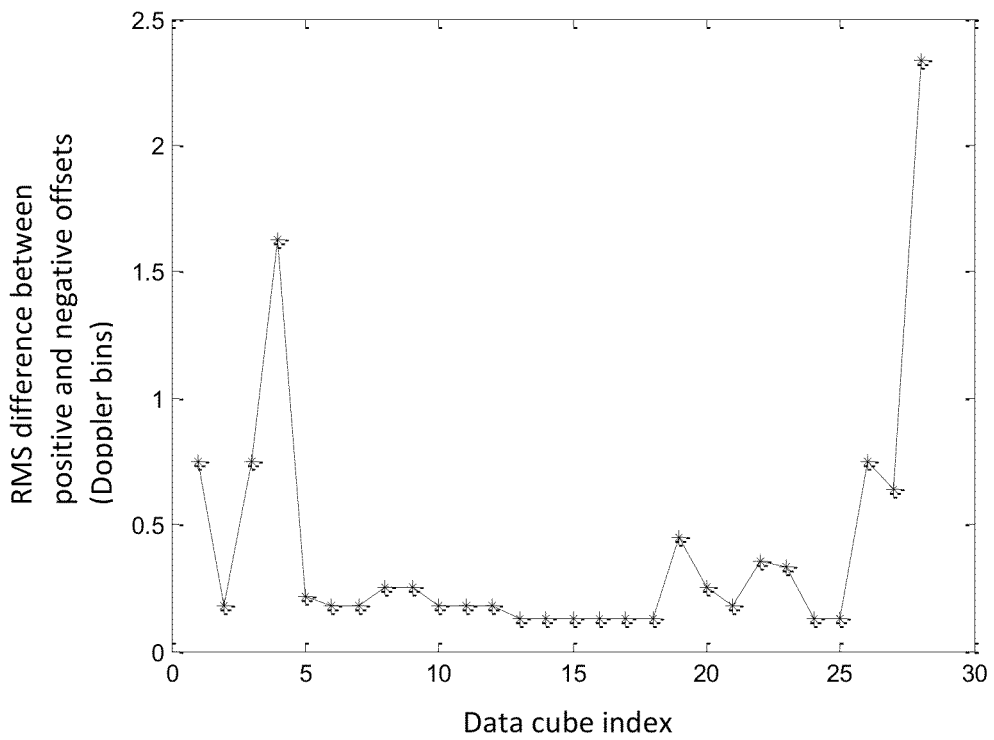
FIG. 10 illustrates the mean difference between positive and negative Doppler frequency estimates as a function of positive Doppler bin index.

FIG. 10 illustrates the mean difference between positive and negative Doppler frequency estimates as a function of positive Doppler bin index. The MTS produced symmetric positive and negative Doppler signals.

More particularly, the plot in FIG. 10 shows that the location estimates following ABC processing preserved the high degree of symmetry inherent in the MTS responses. In this plot, the difference between the corresponding positive and negative frequency estimates are plotted as a function, $f(i)$, of the data cube index, where calculated $f(i)$ using $$f(i) = \sqrt{\frac{1}{N_{targ}} \sum_{\substack{x<0 \\ \text{positive\_freq\_bin\_index}(x) \neq \emptyset}} (x + \text{positive\_freq\_bin\_index}(x))^2}, \quad (11)$$

where x indicates the estimated negative frequency bin (index) of an MTS response, positive_freq_bin_index(x) represents the corresponding, estimated positive frequency bin, the summation is taken over all negative frequency bin estimates with a corresponding positive frequency bin estimate, and $N_{targ}$ represents the number of targets available for the summation.

Negative frequency bins exist because the indices are adjusted so that zero Doppler occurs at bin number 513. For instance, the global Doppler bin 520 may correspond to Doppler bin 7 in equation 11, while the global Doppler bin 506 would correspond to Doppler bin −7 in equation 11. A negative frequency bin, x<0, may correspond to a positive frequency bin, y>0, if (x+y)<3.

Examination of FIG. 10 reveals that, on average, almost all of the data cubes yielded estimates of the MTS target locations (in Doppler space) that were symmetric about zero Doppler (i.e., fell within one Doppler bin of zero). The two notable exceptions were cubes 4 and 28, indicating a bias in the ABC estimate of the DC offset.

Figure 11:
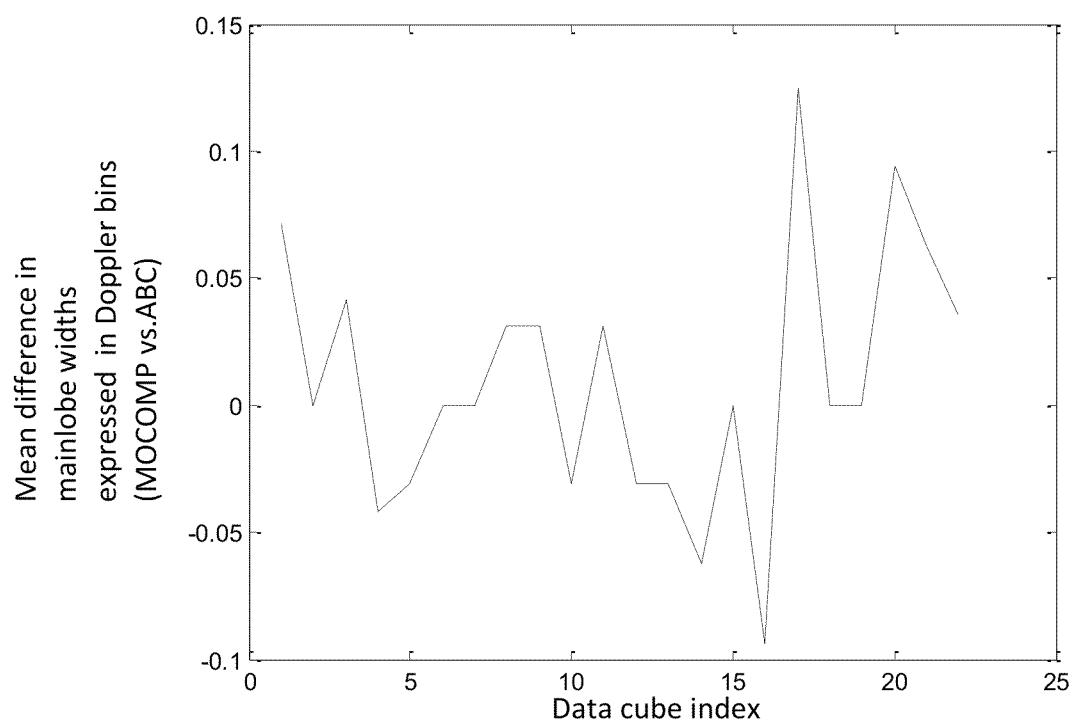
FIG. 11 illustrates the mean difference for several target responses.

Another metric consider was the mainlobe width of MTS and MOCOMP outputs. This metric quantified the cost of applying the ABC algorithm to previously motion-compensated MTI data. FIG. 11 presents the mean difference (i.e., ABC estimated mainlobe width versus MOCOMP calculated mainlobe width) for several target responses. From the plot, it is apparent the maximum difference is a small fraction of one Doppler bin. The plot of FIG. 11 suggests that the ABC processing could be applied in addition to or as a "backup" to standard motion compensation, without introducing any adverse effects. Such an approach would add additional robustness and security to the overall system.

An autofocus algorithm for an MTI mode on a hovering platform was developed and tested it using FORESTER data. As part of this development, the motion compensation concepts employed by the SAR community were leveraged by the inventors and who further extended them for use by the hovering platform performing MTI. The newly formulated ABC algorithm was found to effectively reduce Doppler-domain distortions introduced by errors in the estimated aircraft motion, and it has shown promise as a supplement for existing MOCOMP algorithms. With it, both Doppler frequency target shifts and Doppler frequency target "smearing" due to errors in the estimated aircraft motion may be corrected. In addition, it is believed that the ABC algorithm introduces no adverse effects on the MTS mainlobe width when it is applied.

Results indicate that ABC algorithm processing may be incorporated as an effective complement for measurement-based MOCOMP procedures. For example, the experimental results indicate that the ABC algorithm could replace INS/GPS MOCOMP procedures when precise measurements of aircraft position are not available. The ABC processing may enable significant contributions to the overall effectiveness and reliability of a hovering MTI system.

The ABC algorithm processing first estimates distortions of a received radar signal due to undesired motion of a hovering aircraft, and subsequently removes these distortions. It may be used for either enhancing or replacing an existing MOCOMP system that requires precise, real-time estimates of the aircraft position, provided that the radar system under consideration satisfies certain requirements.

Figure 12:
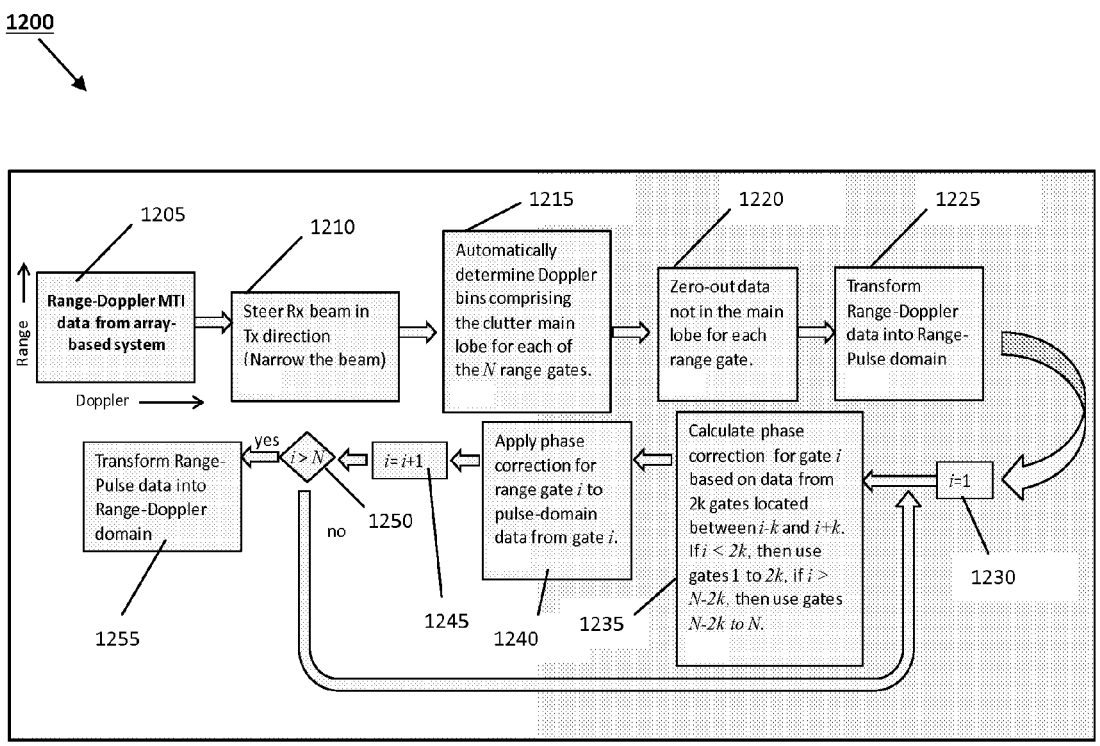
FIG. 12 illustrates a block diagram of the ABC algorithm processing method according to an embodiment of the present invention.

FIG. 12 illustrates a block diagram of the ABC algorithm processing method 1200 according to an embodiment of the present invention. A detailed explanation of the various steps is provided below.

In step 1205, range-Doppler MTI data is provided from an array-based system. The array-based system may be the DARPA FORESTER system, for example. In some embodiments, the radar system under consideration includes an array of L receive antennas, providing L coherent channels that support the implementation of standard beam-steering algorithms. Beam-steering may be implemented via hardware, digitally, or a combination thereof. In addition to the L receive channels, the radar system also measures M coherent pulses within one coherent processing interval (CPI), and this coherent data is suitable for standard frequency-domain analysis (such as via a fast Fourier transform (FFT)). A coherent processing interval (CPI) of many seconds may be used to produce high-resolution for instance. The radar measures all of this coherent data at each of N specific ranges, providing the GMTI algorithm access to an N×L×M data cube.

System architecture of this type has long been used within the GMTI community (e.g. for space-time adaptive processing (STAP)) as discussed, for example, by Brennan, L. et al., "Adaptive arrays in airborne MTI", IEEE Trans., 1976, AP-24, (5), pp. 607-615, & Ward, J., "Space-time adaptive processing for airborne radar" Technical Report No. 1015, Lincoln Laboratory, MIT, December 1994, herein incorporated by reference. This architecture can similarly be applied to a single-channel system, provided that the system beamwidth is narrow enough to provide adequate angular resolution.

In step 1210, beam steering is performed. Beam steering involves changing the direction of the main lobe of a radiation pattern. This may be accomplished by switching antenna elements or by changing the relative phases of the RF signals driving the elements. In one embodiment, the beam steering includes steering the receive beam in a desired direction by applying an appropriate phase adjustment at each receive (Rx) element, and summing across the dimension of the N×L×M data cube corresponding to the antenna array elements. This step reduces the three-dimensional N×L×M data cube to a two-dimensional N×M data cube. If single-channel range-Doppler data is used, then this step may be eliminated.

In step 1215, the width of the main clutter lobe is determined. This may be performed by identifying the Doppler cells that are: (a) at least x dB below the peak value, and (b) closest to the Doppler cell containing the peak value. This operation may be repeated for each of the N range gates. In some instances, x may be 10 dB. The closest cell represents the cell offset by the smallest number of pixels from the peak.

Figure 20:
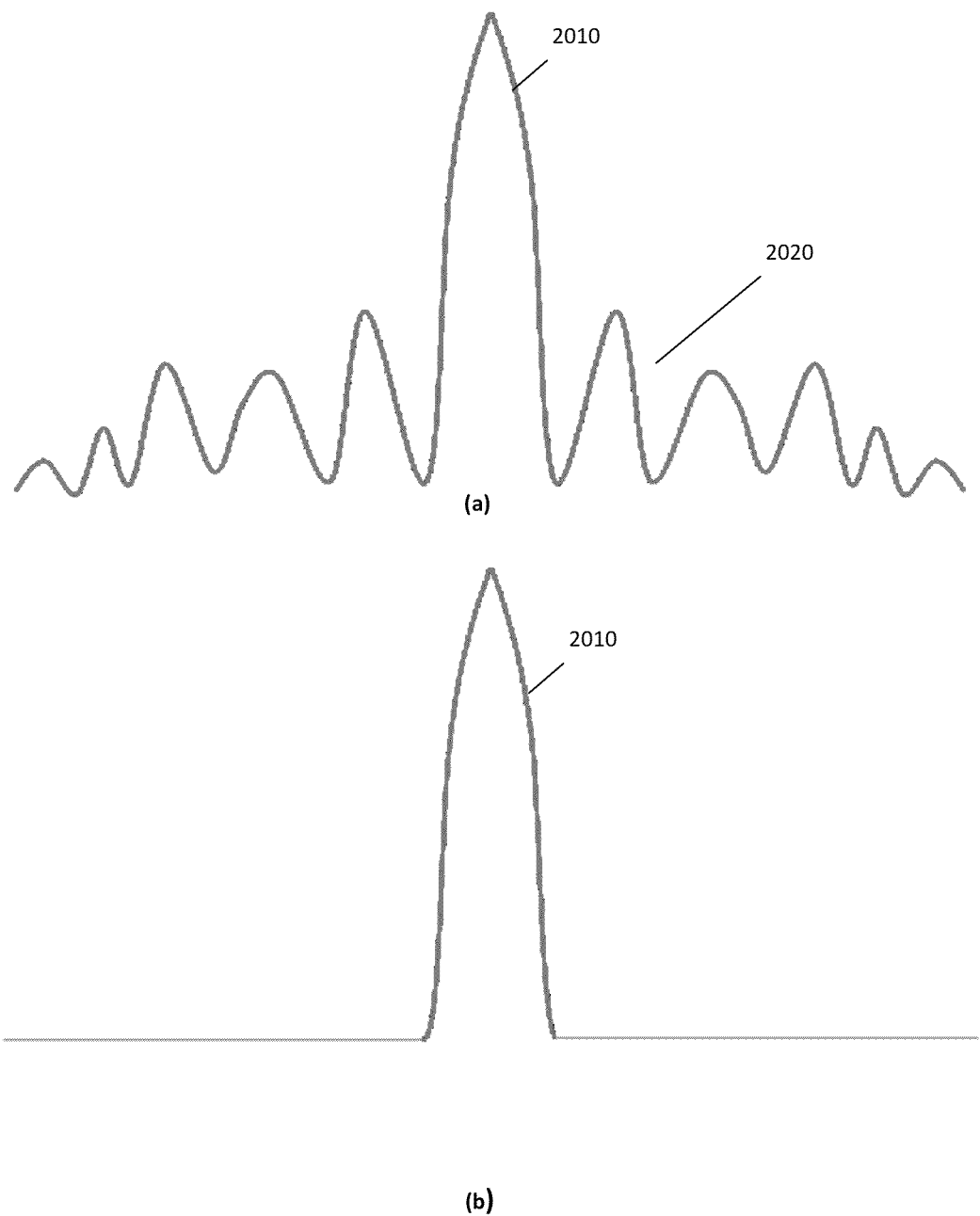
FIG. 20 illustrates schematics showing elimination of the "non-main-lobe clutter" response.

In step 1220, data that is not part of the main-lobe clutter response is excluded or eliminated. To illustrate elimination of the non-main-lobe clutter response further reference is made to FIG. 20. For example, FIG. 20A shows the nominal Doppler profile (signature) magnitude including the Main lobe 2010 and non-Main lobe clutter 2020. And FIG. 20B shows the nominal Doppler profile (signature) magnitude with the non-Main-lobe-clutter 2020 removed. It is noted that the full profiles for both signatures here are complex.

Referring back to FIG. 12, in step 1225, an inverse FFT is executed along the Doppler dimension. This operation transforms range Doppler data into the Range pulse domain. In step 1230, the range gate counter i is initially set to a 1.

In step 1235, the phase correction term is calculated similar to a synthetic aperture radar (SAR) autofocus technique. For example, this correction could be calculated according to the following equations:

$$\Delta\hat{\phi}(m) = \angle \sum_{i=1}^{2k+1} f^*(i, m-1) f(i, m), \text{ and} \quad (12)$$

$$\hat{\phi}(m) = \sum_{l=1}^{m} \Delta\hat{\phi}(l), \quad (13)$$

where $f(i,j)$ represents the (complex) radar measurement at range gate i for pulse m, $f^*(i,j)$ denotes the complex conjugate of $f(i,j)$, $\angle f(i,j)$ denotes the phase angle of the complex quantity ƒ(i,j), and φ̂(m) represents the final phase correction term. Equations 12 and 13 are essentially the same as Equations 1 and 2, except for the underlying variables.

In step 1240, the phase correction term is then applied according to the equation.

$$\hat{f}(k,m) = f(k,m)e^{-i\hat{\phi}(m)} \quad (14)$$

Previously, in Equation 3, there was a 2-D spatial domain (x vs. y). Now, in Equation 14, there is a space vs. frequency domain. And the initial image which is to be to "sharpened" or "focused" is the range-Doppler image.

In step 1245, the range gate counter i is increased in value by 1. A determination is made in step 1250 whether the range gate counter value i is greater than N. If the determination here is "yes," the process proceeds to step 1255. Otherwise, if the determination is "no," the process returns to step 1235 for the next range gate.

In step 1255, the motion-compensated, beam-steered data is converted to the range-CPI domain. Since the targets may be assumed to be at extremely far ranges, the phase correction term, φ̂(m), can also be applied separately to each of the L channels. This yields the motion-compensated data cube suitable for down-stream GMTI (e.g. STAP) processing.

FIG. 13 illustrates block diagrams of GMTI system showing incorporation of the ABC processing step according to embodiments of the present invention. In step 1310, range-CPI MTI data is collected by an array-based system may be provided. In step 1320, compensation for effects of aircraft motion using measurement of aircraft position may be made. In step 1330, transformation from Range-CPI domain to Range Doppler Domain takes place. In step 1340, ABC processing according to embodiments of the present invention commences. In step 1350, downstream GMTI processing may be performed. In step 1360, moving target detection list occurs.

Figure 13A:
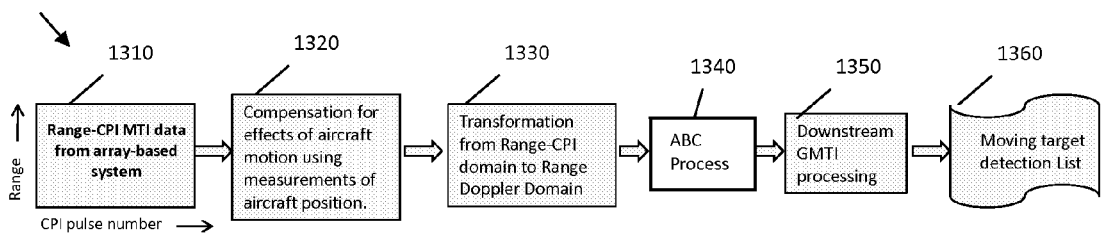
FIG. 13 illustrates block diagrams of GMTI system showing incorporation of the ABC processing step.
Figure 13B:
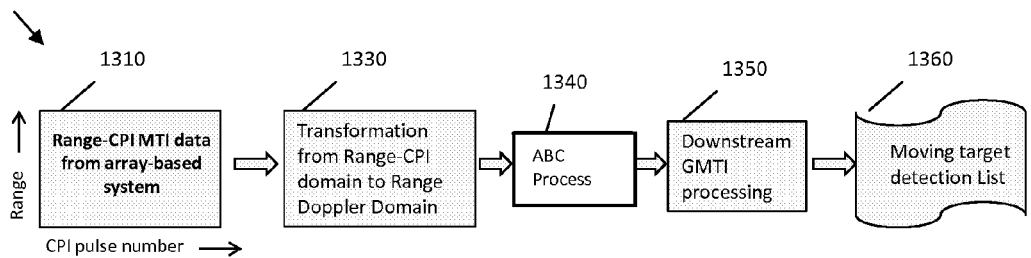

In the method 1300a shown in FIG. 13(a), the ABC processing has been incorporated into an existing MOCOMP system based on aircraft position measurements. In the method 1300b shown in FIG. 13(b), the ABC processing replaces an existing MOCOMP system based on aircraft position measurements. Step 1320 thus is not present in this process. This enables use of in situ clutter measurements to compensate for unmeasured aircraft motion in hovering GMTI systems. Reliance on measured aircraft position as part of MOCOMP calculation need no longer be solely considered.

Figure 14:
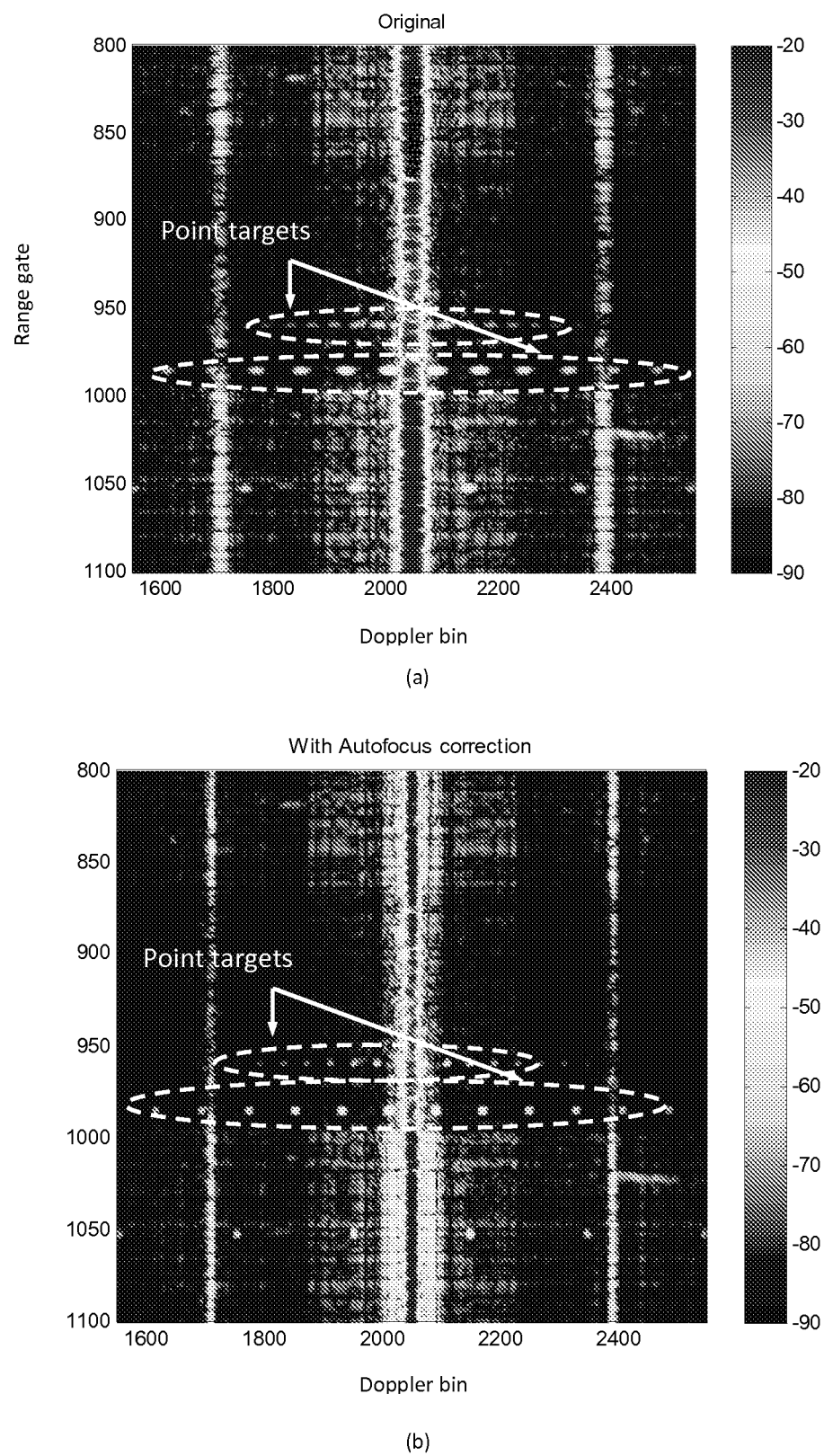
FIGS. 14 and 15 illustrate examples of range-Doppler data before and after ABC processing.
Figure 15:
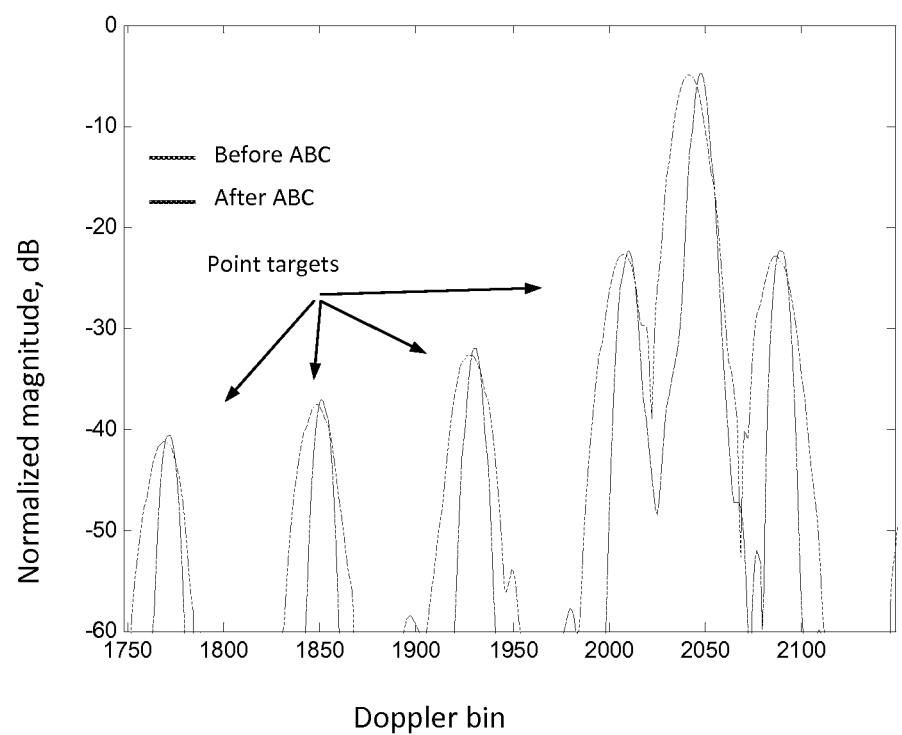

FIGS. 14 and 15 illustrate examples of range-Doppler data before and after ABC processing. The improvements due to motion compensation are clearly evident. Before ABC processing, no artificial aircraft motion has been introduced. Evidence of "smearing" is clearly visible on the point targets in FIG. 14. FIG. 15 illustrates a plot of point target responses before and after the ABC correction for the clutter main lobe and a subset of point target responses. After ABC processing, the increased width of the point target responses (i.e. smearing) is evident in FIG. 15.

Figure 16:
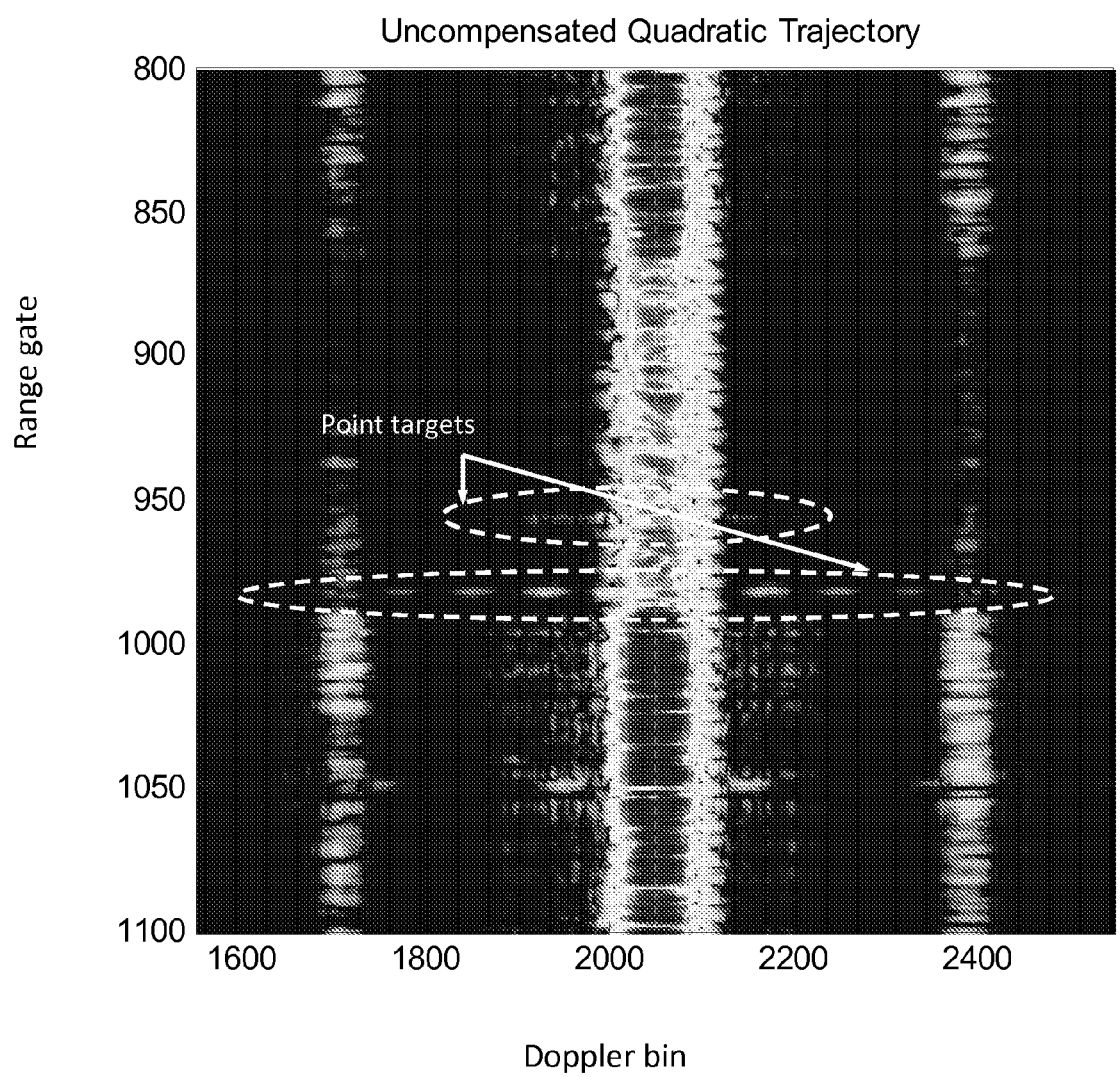
FIG. 16 illustrates the distortion of a point-target response produced by an artificially introduced slant-range motion component.
Figure 17:
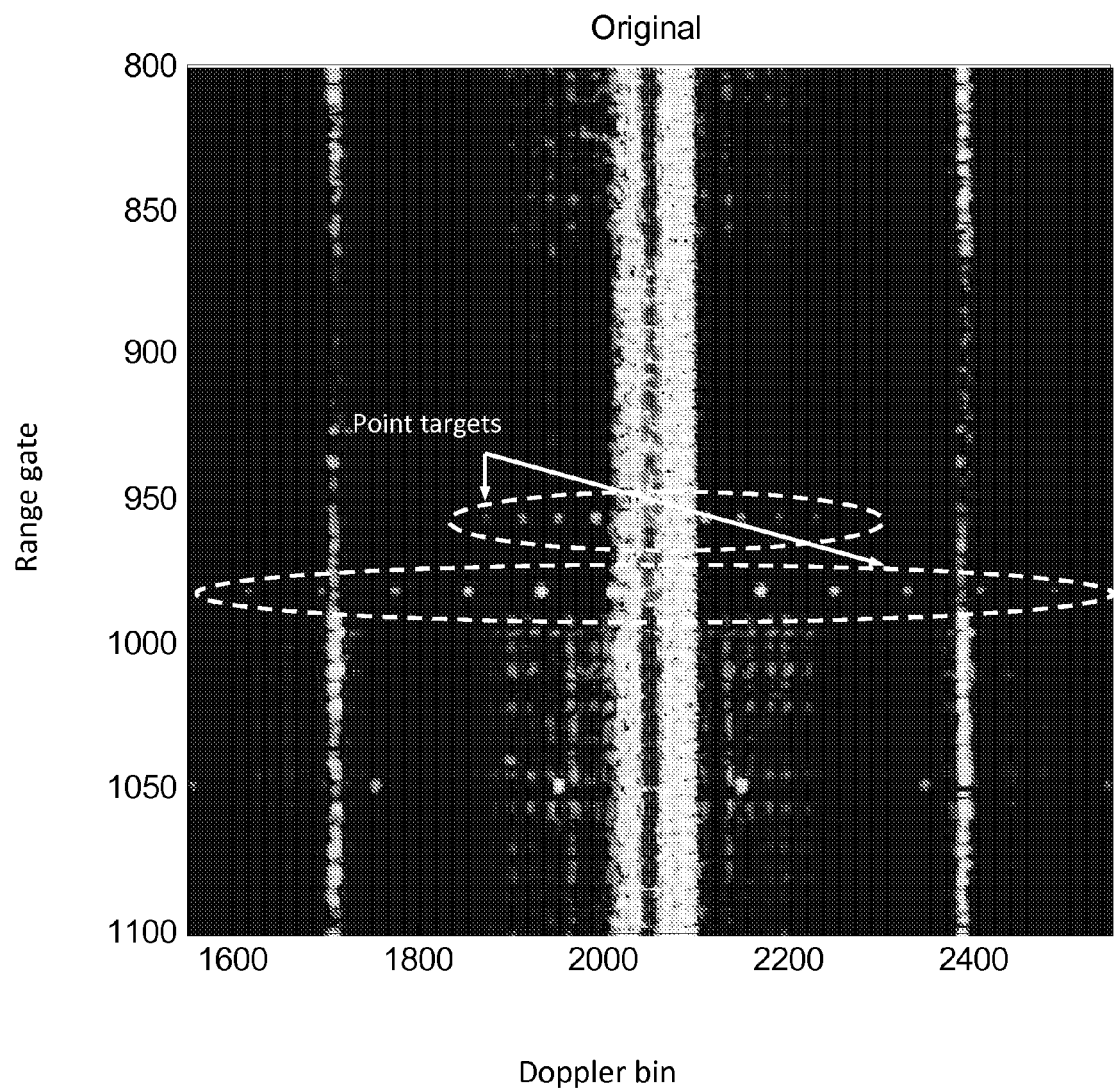
FIG. 17 shows the compensated point-target response after ABC processing.
Figure 18:
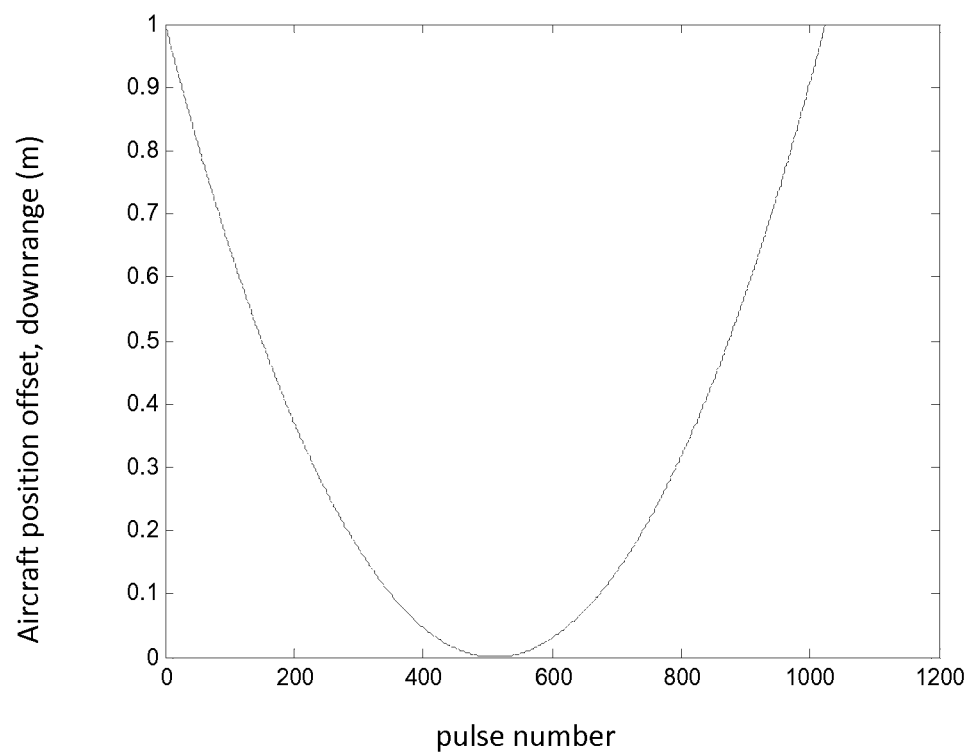
FIG. 18 illustrates shows the relative uncompensated aircraft offset in the slant-plane as a function of CPI pulse number.

FIG. 16 illustrates the distortion of a point-target response produced by an artificially introduced slant-range motion component. Smearing across multiple Doppler bins is evident in the point-target responses. FIG. 17 shows the relative uncompensated aircraft offset in the slant-plane as a function of CPI pulse number. FIG. 18 illustrates the relative aircraft position as a function of CPI pulse number. The uncompensated motion depicted by this plot produced the image distortions in FIG. 16. Offsets are all in the slant plane. It is evident from FIGS. 16-18 that a failure in the motion compensation algorithm would have serious repercussions for downstream GMTI processing. This represents a problem in the current paradigm.

Measurement-based MOCOMP systems require high-precision position estimates to successfully eliminate the GMTI signal distortions in hovering aircraft due to aircraft motion. If the position measurement system fails or provides inaccurate estimates, then the motion-induced distortions cannot be reliably corrected. In fact, if the position estimates are severely erroneous and the aircraft motion is extreme, then the "compensated" GMTI signal may be more distorted than the "uncompensated" signal.

Embodiments of the present invention solves this problem by formulating a MOCOMP solution adaptively, using clutter samples from the observed scene. Earlier imagery demonstrated the effects of aircraft motion on GMTI canonical target signatures. The ABC algorithm effectively sharpens the point target response when motion-induced "smearing" has occurred. It also produces no adverse effects when applied to data that has already been successfully corrected using a measurement-based MOCOMP procedure. Moreover, the ABC algorithm need not rely upon measured positional information of the moving platform.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A method for autofocus based compensation of range data acquired from an object in motion, the method comprising:
   receiving, from a sensor mounted on the object in motion, range data comprising frequency measurements at various distances or ranges; and
   processing the range data, with a processor, by:
   steering a main lobe of at least one receive beam of the range data in a desired direction;
   determining the width of a main-lobe clutter response of the steered beam;
   excluding data that is not part of the main-lobe clutter response of the steered beam;
   transforming the main-lobe clutter response of the steered beam into a space vs. frequency domain;
   calculating a phase correction term for the transformed main-lobe clutter response;
   transforming the range data into a space vs. time domain; and
   applying the phase correction to the transformed range data.

2. The method of claim 1, wherein the range data comprises Doppler, radar, sonar or other active sensor data.

3. The method of claim 1, wherein the range data comprises measurements from an array of receive elements and steering the receive beam comprises: applying an appropriate phase adjustment at each receive element, and summing across the array-element dimension.

4. The method of claim 1, wherein determining the width of the main clutter lobe comprises:
determining a peak value; and
identifying cells that are (a) within a predetermined amount below the peak value, and (b) closest to the cell containing the peak value.

5. The method of claim 4, further comprising:
repeating the processes recited in claim 3, for each distance or range of the range data.

6. The method according to claim 1, wherein the phase correction is calculated according to the following equations:

$$\Delta \hat{\phi}(m) = \angle \sum_{i=1}^{2k+1} f^*(i, m-1) f(i, m), \text{ and}$$

$$\hat{\phi}(m) = \sum_{l=1}^{m} \Delta \phi(l),$$

where $f(i,j)$ represents the (complex) measurement at range gate i for pulse m, $f^*(i,j)$ denotes the complex conjugate of $f(i,j)$, $\angle f(i,j)$ denotes the phase angle of the complex quantity $f(i,j)$, and $\hat{\phi}(m)$ represents the final phase correction term.

7. The method according to claim 6, wherein the phase correction term is applied according to the following equation:

$$\tilde{f}(k, m) = f(k, m) e^{-i\hat{\phi}(m)},$$

where $f(k,m)$ is a range measurement at a range distance k and a pulse m.

8. The method of claim 1, further comprising:
compensating for the effects of platform motion using measurements of the platform's position.

9. The method of claim 1, wherein the sensor measures pulses during a coherent processing interval and the method further comprising:
transforming the pulse data from (in the coherent processing interval into the range data.

10. The method of claim 1, wherein the range data comprises data for multiple channels and the phase correction term is separately applied to each channel of the range data.

11. The method of claim 1, wherein the method does not rely upon measured positional information of the object.

12. The method of claim 1, wherein steering the at least one receive beam is implemented via hardware, digitally, or a combination thereof.

13. A system for autofocus based compensation for range data acquired from an object in motion, the system comprising:
a processor configured to:
receive, from a sensor mounted on the object in motion, range data comprising frequency measurements at various distances or ranges;
steer a main lobe of at least one receive beam of the range data in a desired direction;
determine the width of a main-lobe clutter response of the steered beam;
exclude data that is not part of the main lobe clutter response of the steered beam;
transform the main-lobe clutter response of the steered beam into a space vs. frequency domain;
calculate a phase correction term for the transformed main-lobe clutter response;
transform the range data into a space vs. time domain; and
apply the phase correction to the transformed range data.

14. The system of claim 13, wherein the system is incorporated into the object.

15. The system of claim 14, wherein the object is an aerial vehicle, a marine vehicle, or a space-based platform.

16. The system of claim 13, wherein the system further includes a motion compensation (MOCOMP) system.

17. A non-transitory computer-readable storage medium having computer-readable instructions, that when executed by a processor, implement a method for autofocus based compensation of range data acquired from a sensor of an object in motion, the method comprising:
receiving, from a sensor mounted on the object in motion, range data comprising frequency measurements at various distances or ranges;
steering a main lobe of at least one receive beam of the range data in a desired direction;
determining the width of a main-lobe clutter response of the steered beam;
excluding data that is not part of the main lobe clutter response of the steered beam;
transforming the main-lobe clutter response of the steered beam into a space vs. frequency domain;
calculating a phase correction term for the transformed main-lobe clutter response;
transforming the range data into a space vs. time domain; and
applying the phase correction to the transformed range data.

* * * * *